United States Patent [19]

Chang

[11] Patent Number: 5,370,849
[45] Date of Patent: Dec. 6, 1994

[54] METAL CHELATE PROCESS TO REMOVE POLLUTANTS FROM FLUIDS

[75] Inventor: Shih-Ger T. Chang, El Cerrito, Calif.

[73] Assignee: The Regents of the University of California, Oakland, Calif.

[21] Appl. No.: 968,585

[22] Filed: Oct. 29, 1992

[51] Int. Cl.$^5$ .............................................. C01B 21/00
[52] U.S. Cl. ...................... 423/239.1; 423/242.2; 423/243.01
[58] Field of Search .................. 423/235, 235 D, 239, 423/239 A, 239 Y, 243.01, 243.08, 242.2

[56] References Cited

U.S. PATENT DOCUMENTS 3,984,522 10/1976 Saito et al. ........................... 423/235
4,732,744 3/1988 Chang et al. ........................ 423/235

*Primary Examiner*—Michael Lewis
*Assistant Examiner*—Thomas G. Dunn, Jr.

*Attorney, Agent, or Firm*—Phillips Moore Lempio & Finley

[57] ABSTRACT

The present invention relates to improved methods using an organic iron chelate to remove pollutants from fluids, such as flue gas. Specifically, the present invention relates to a process to remove $NO_x$ and optionally $SO_2$ from a fluid using a metal ion ($Fe^{2+}$) chelate wherein the ligand is a dimercapto compound wherein the —SH groups are attached to adjacent carbon atoms (HS—C—C—SH) or (SH—C—CCSH) and contain a polar functional group so that the ligand of DMC chelate is water soluble. Alternatively, the DMC' is covalently attached to a water insoluble substrate such as a polymer or resin, e.g., polystyrene. The chelate is regenerated using electroreduction or a chemical additive. The dimercapto compound bonded to a water insoluble substrate is also useful to lower the concentration or remove hazardous metal ions from an aqueous solution.

16 Claims, 13 Drawing Sheets

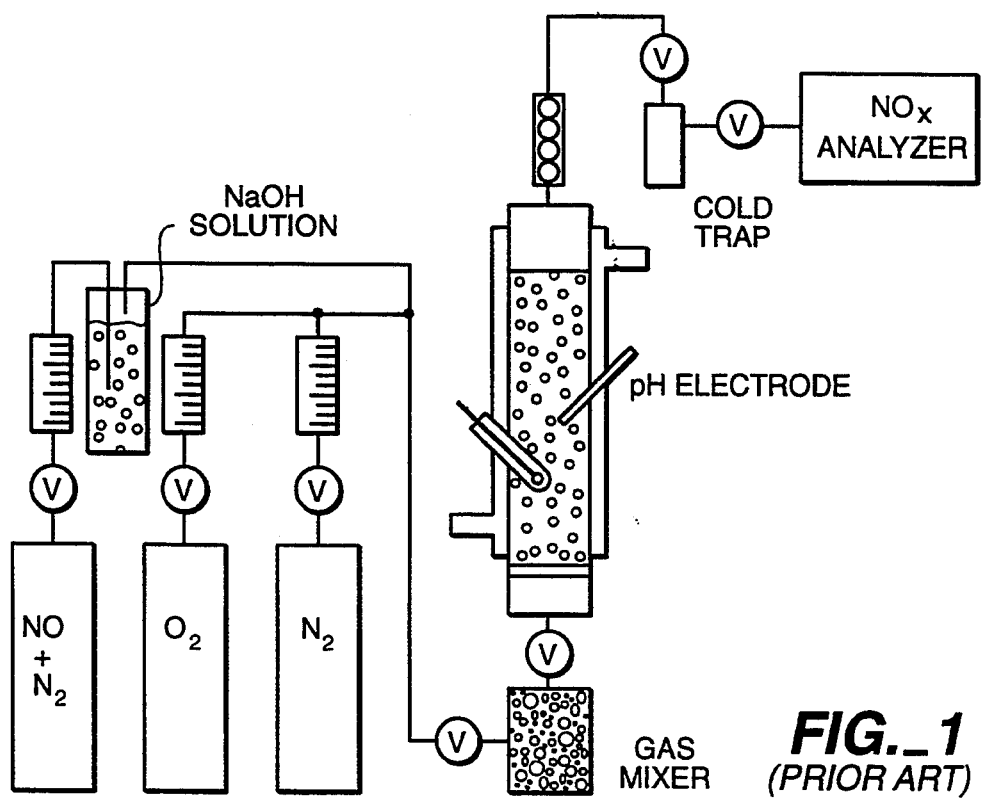
FIG._1
*(PRIOR ART)*
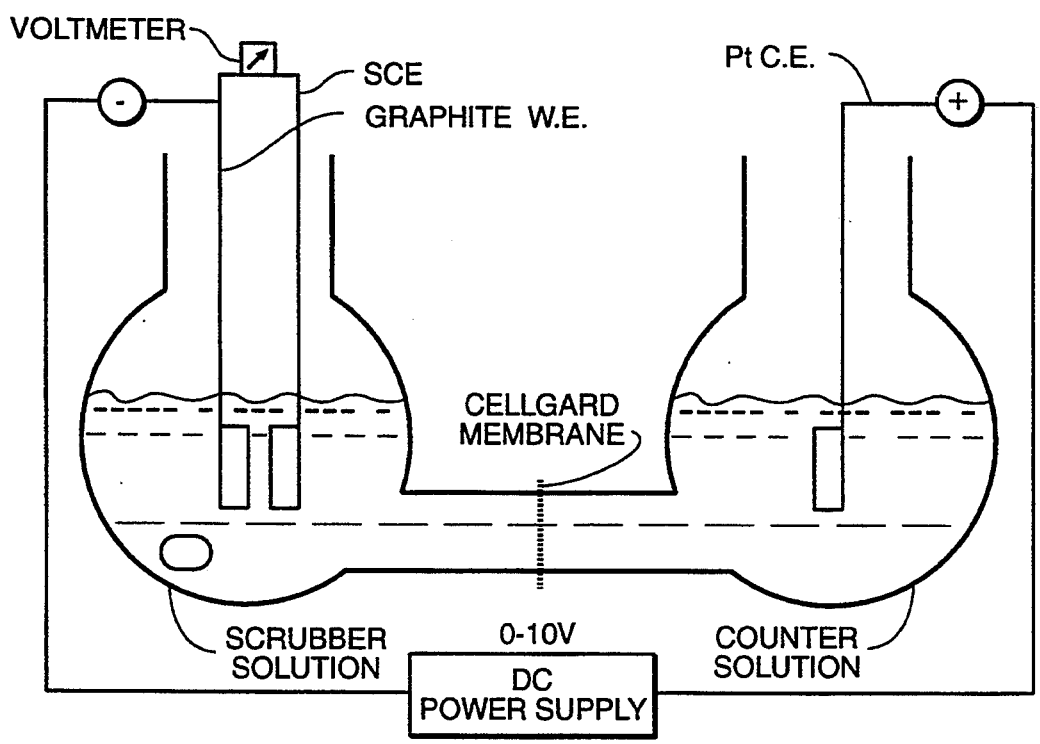
FIG._3

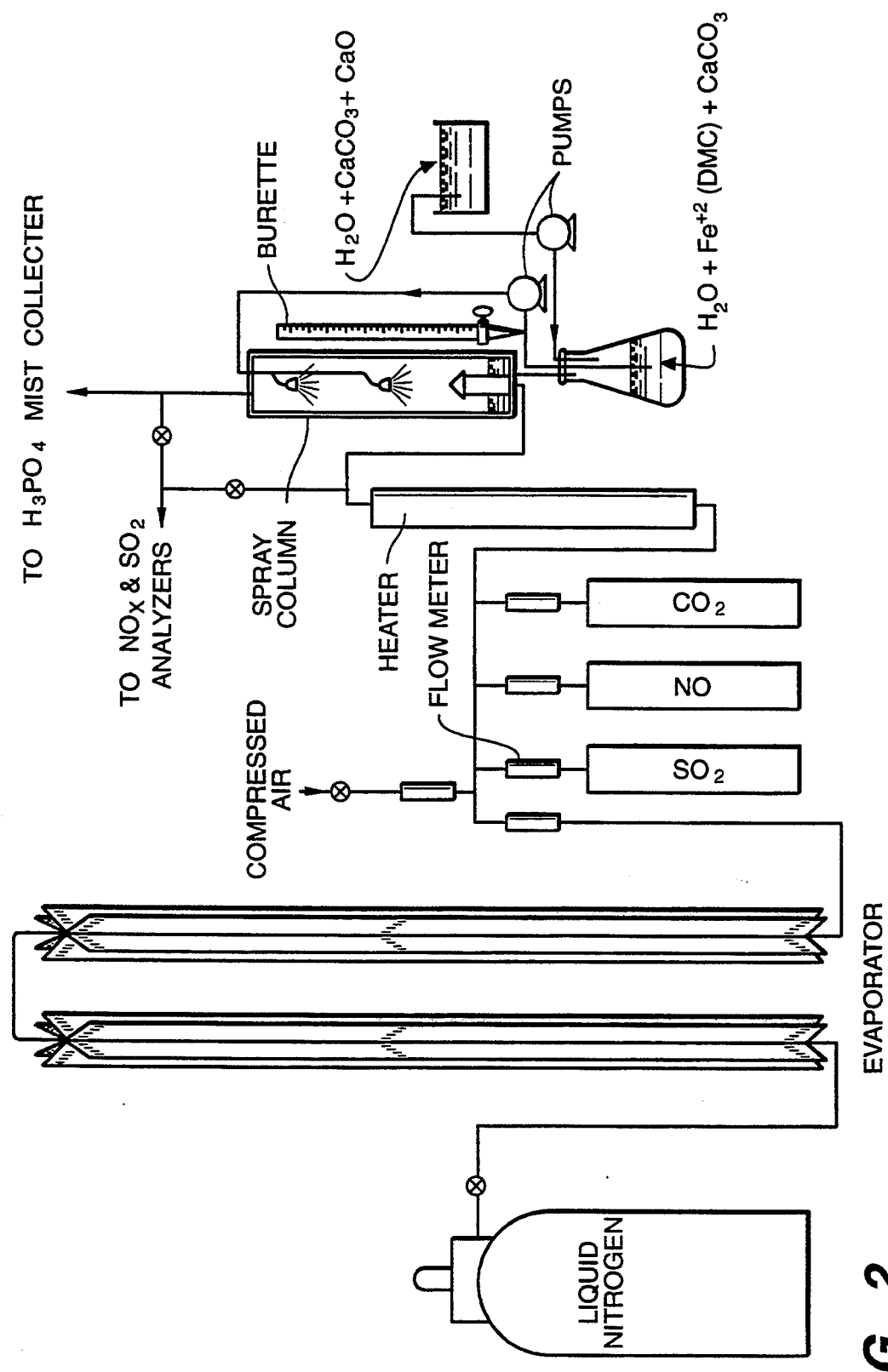
FIG._2
(PRIOR ART)

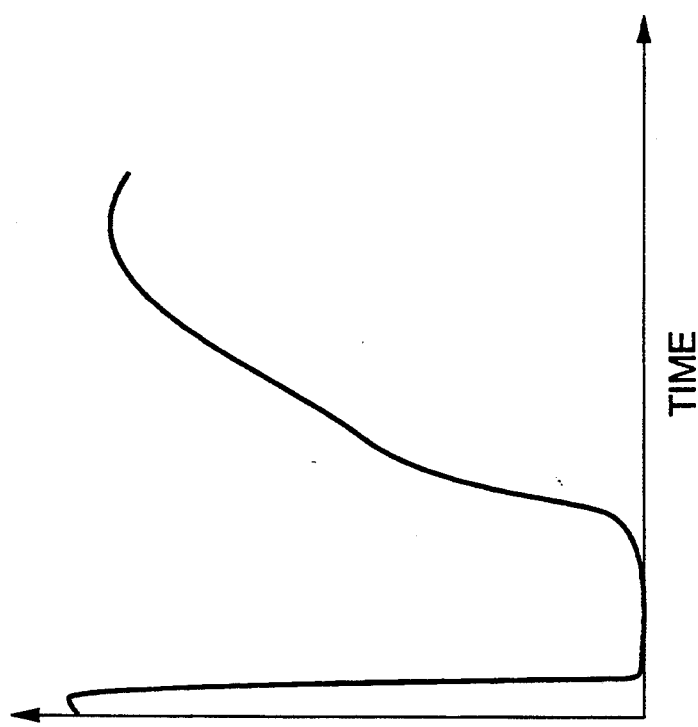
FIG._4B
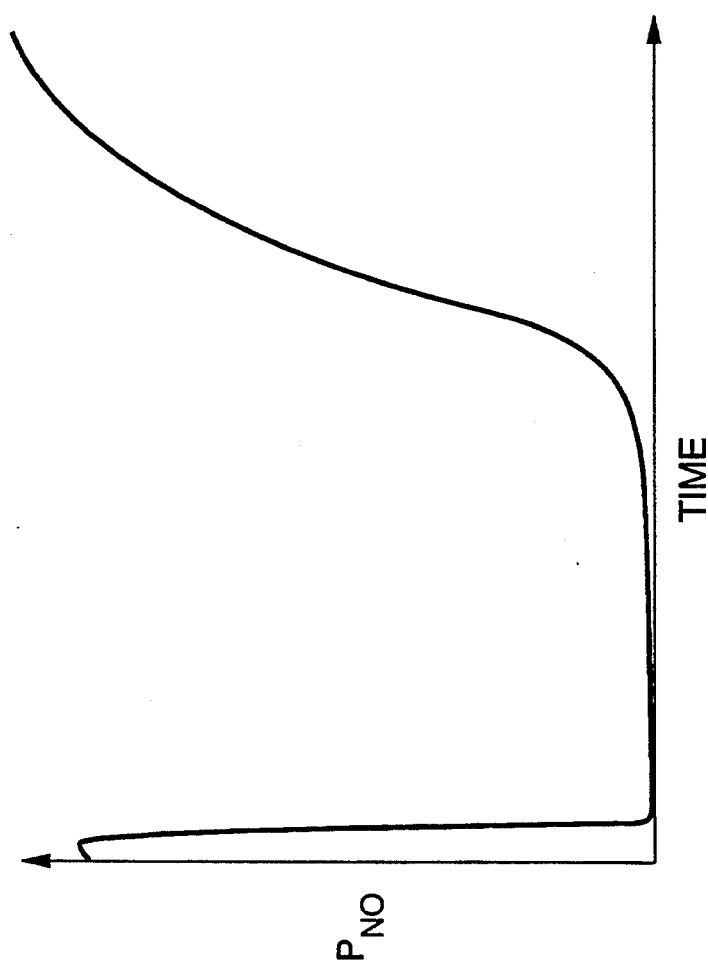
FIG._4A

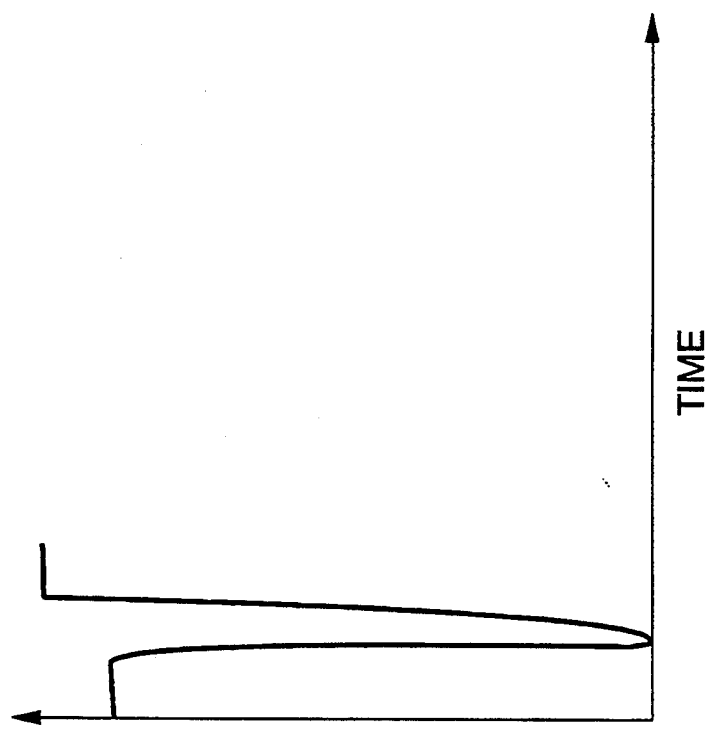
FIG._5B
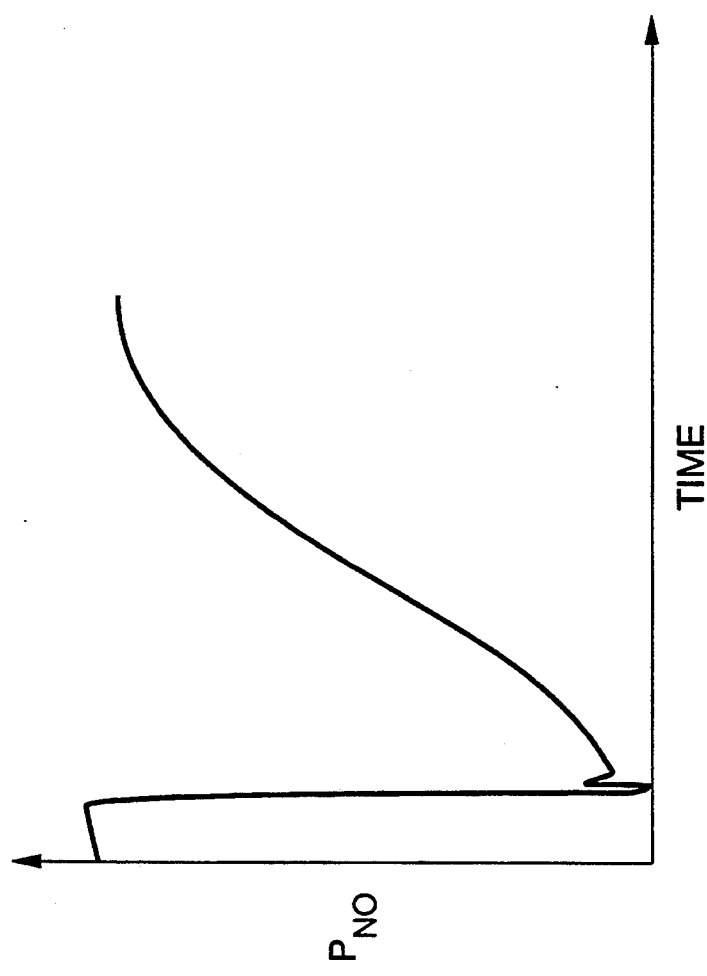
FIG._5A

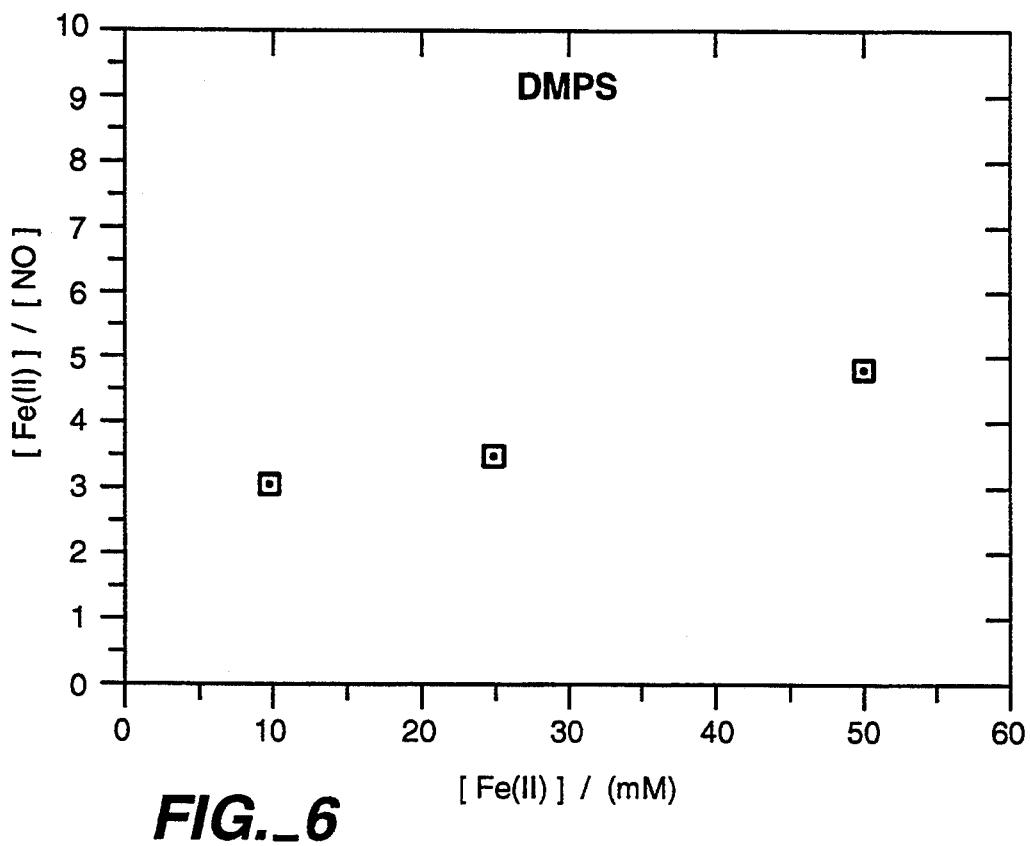
FIG._6
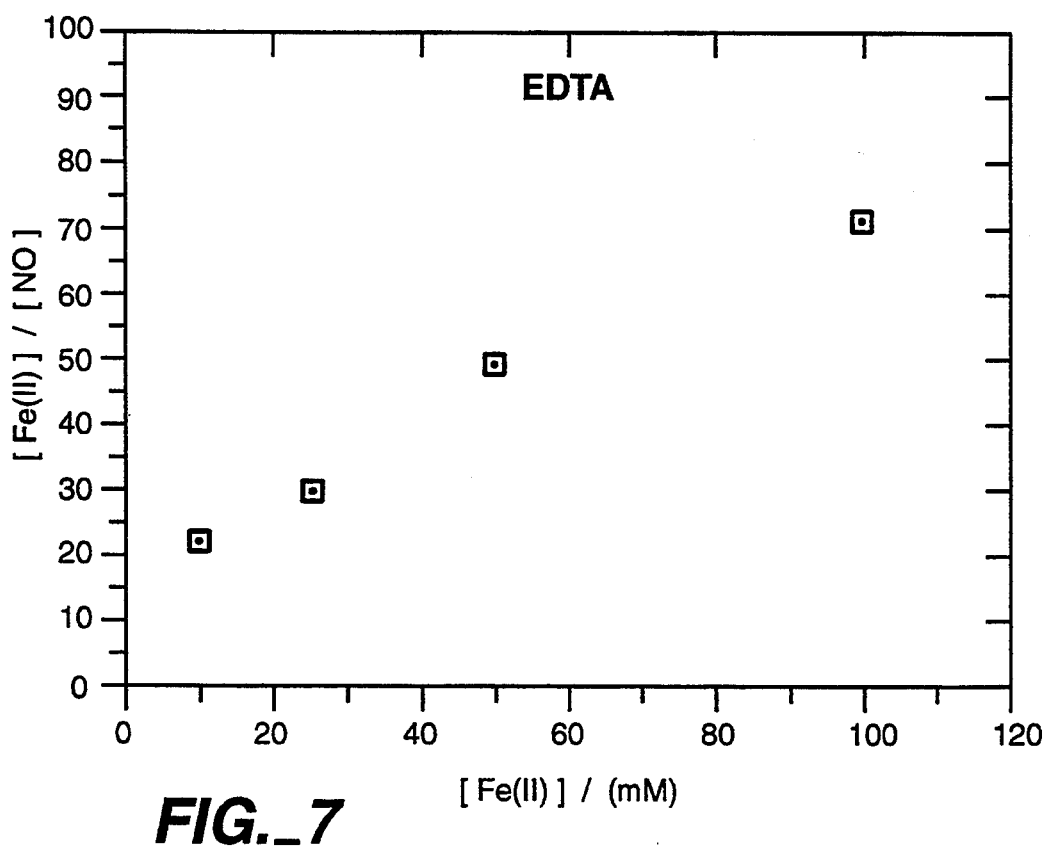
FIG._7

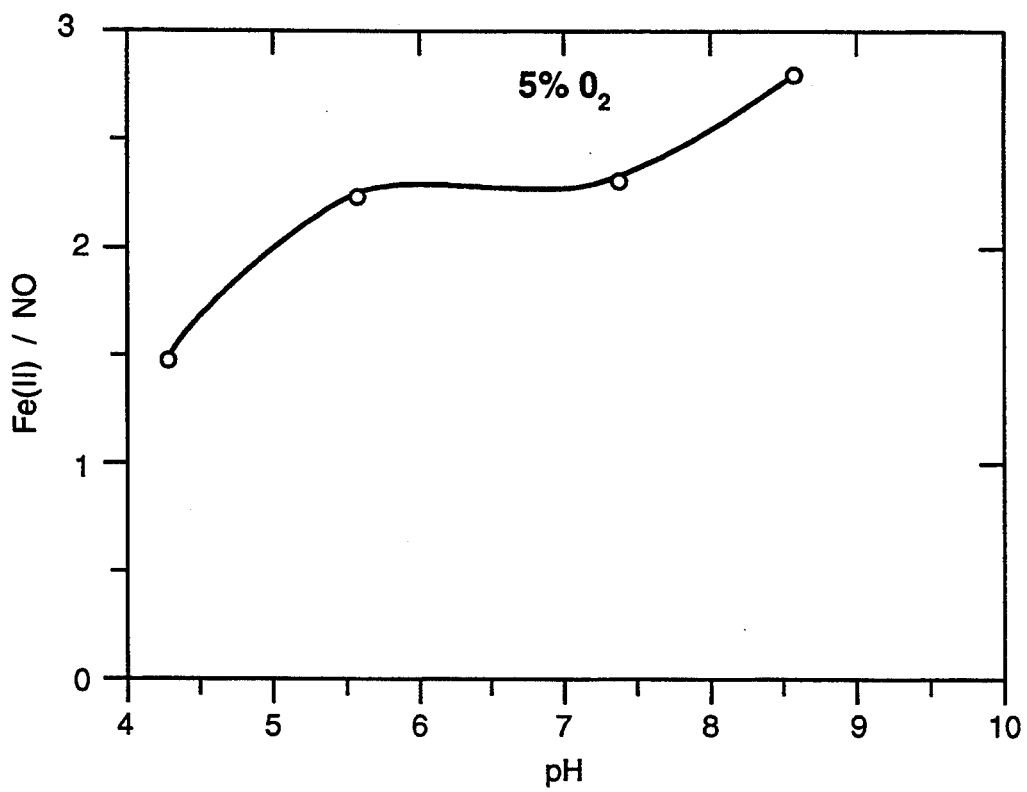
FIG._8
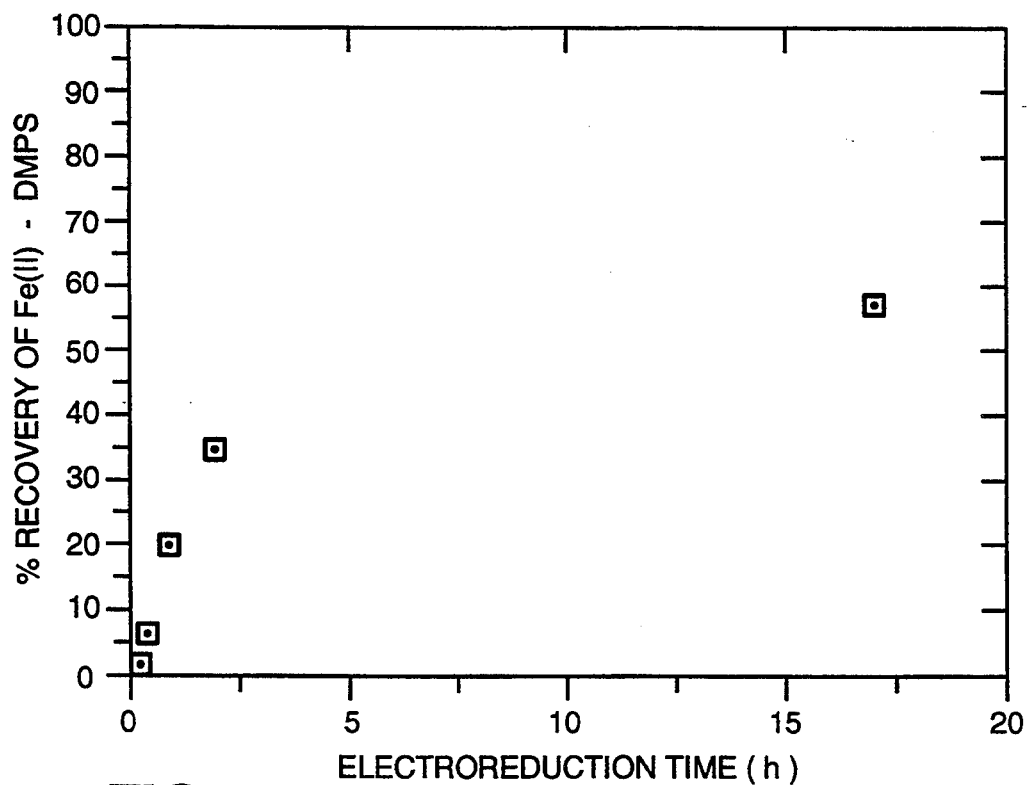
FIG._13

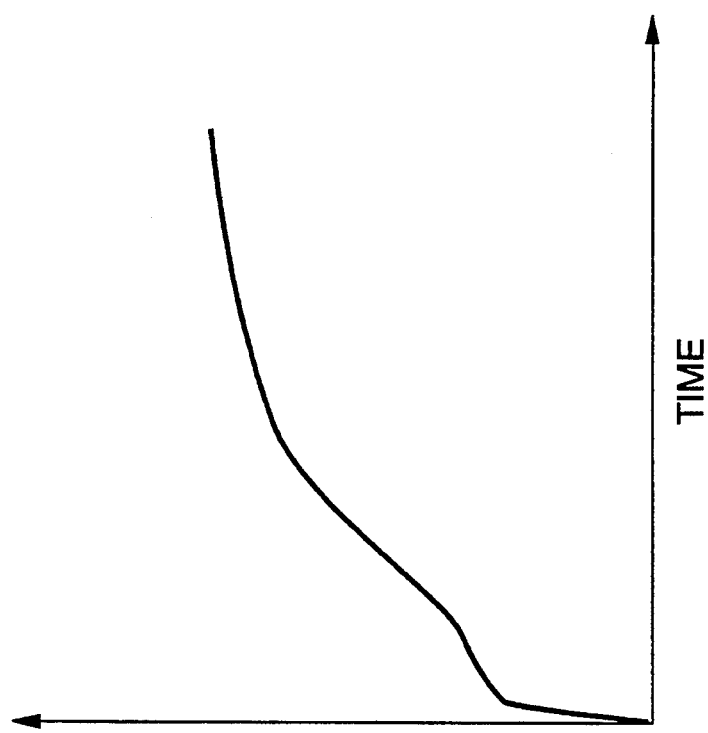
FIG._9B
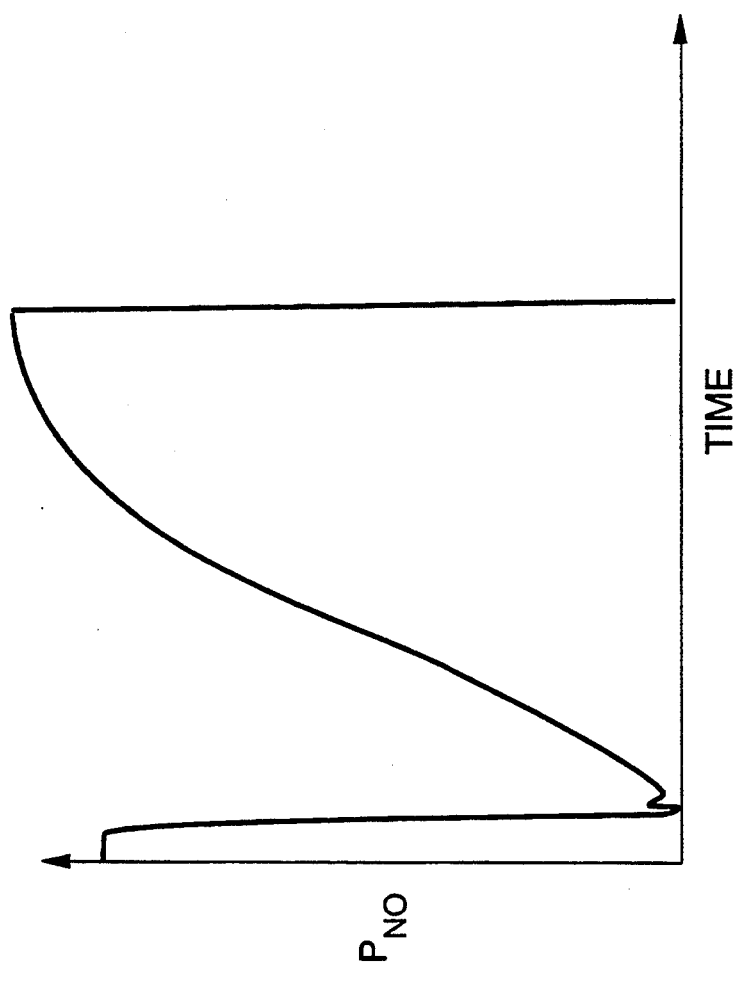
FIG._9A

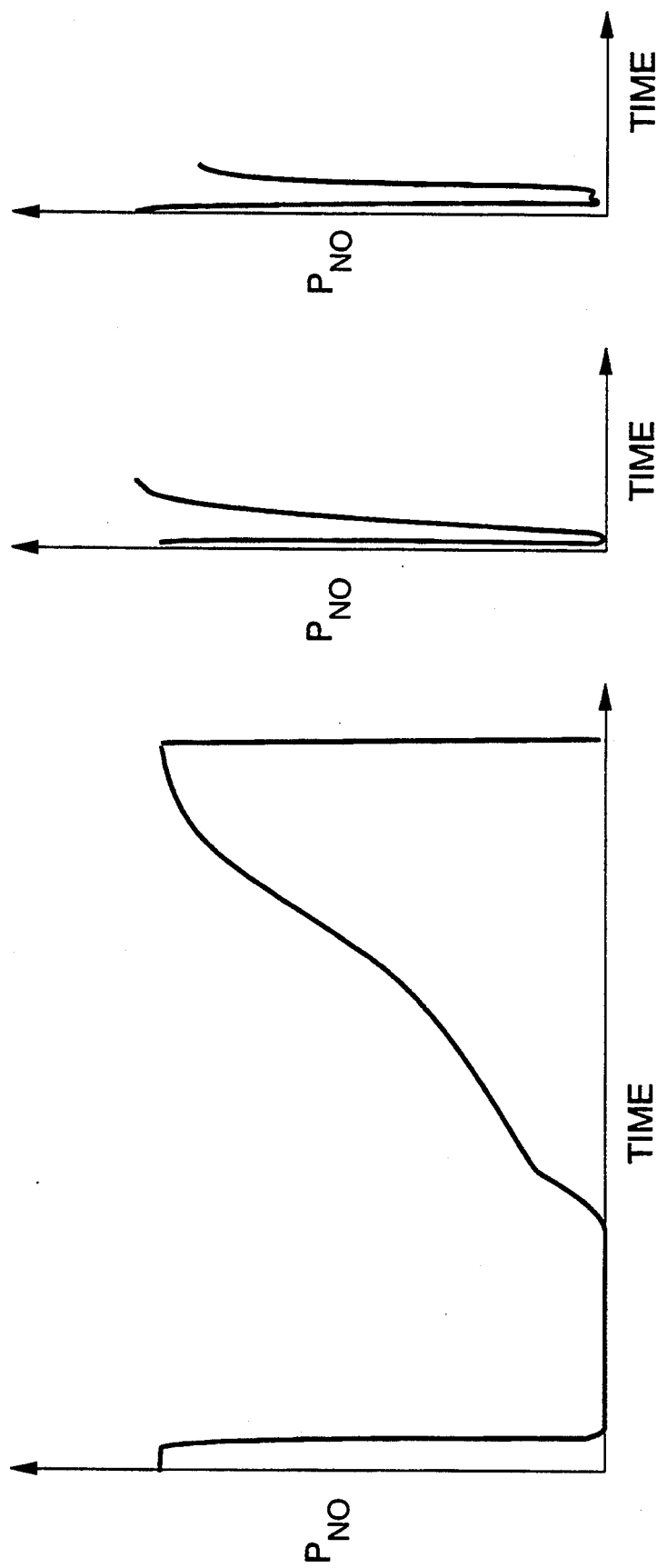

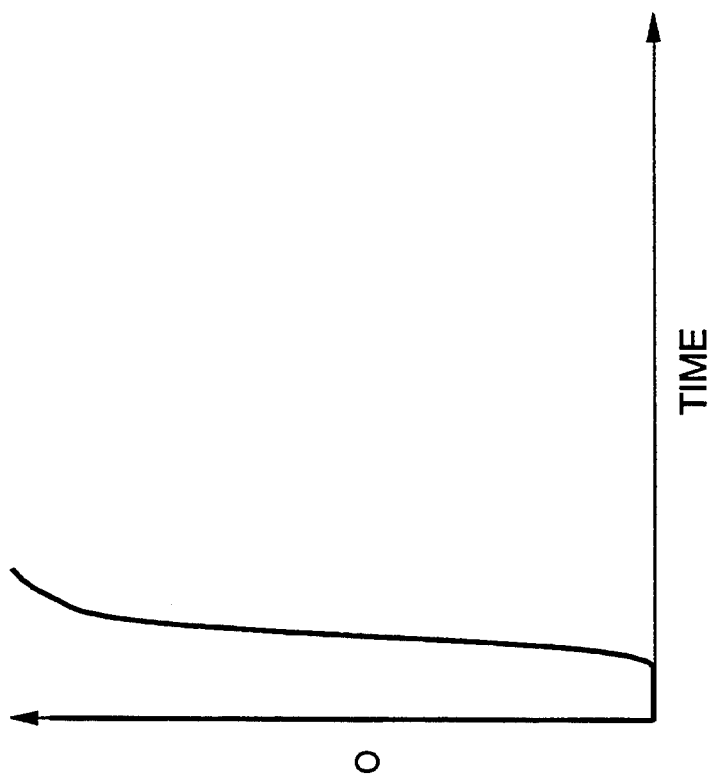
FIG._11B
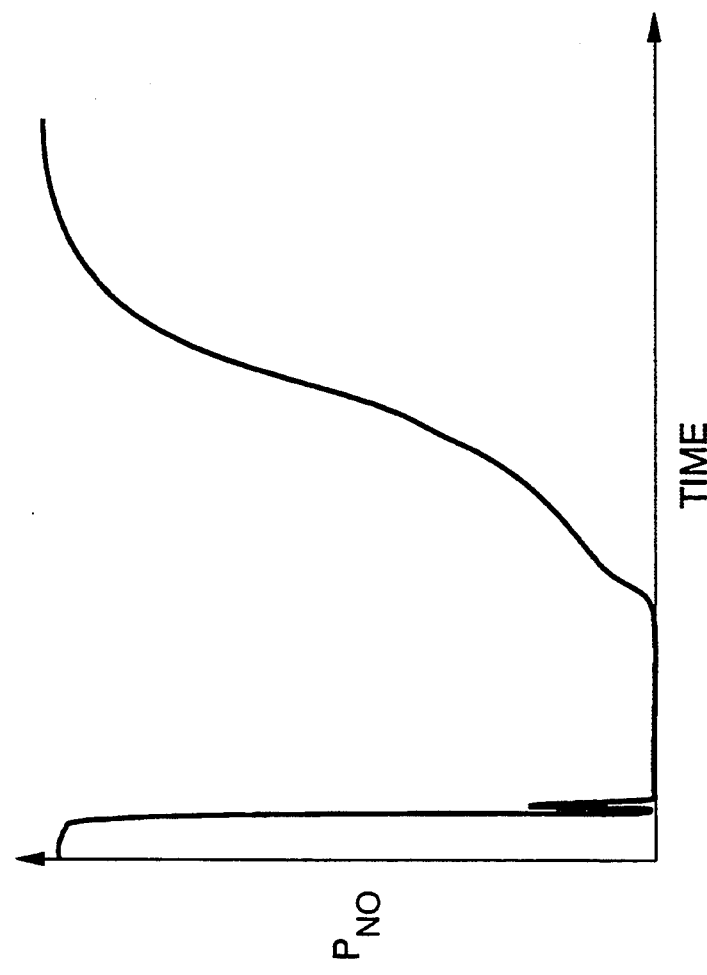
FIG._11A

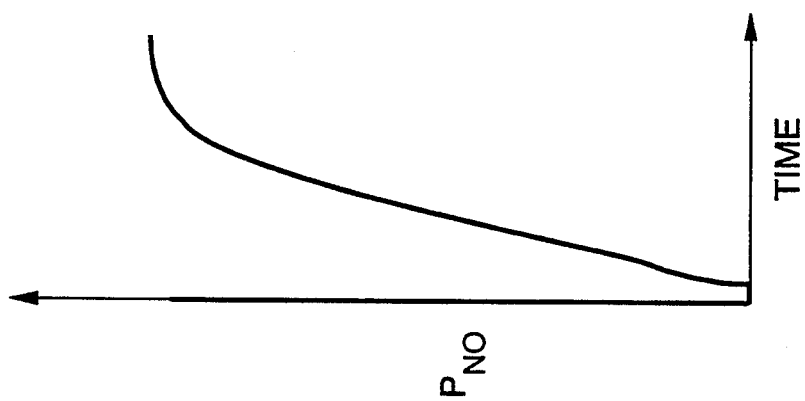
FIG._12C
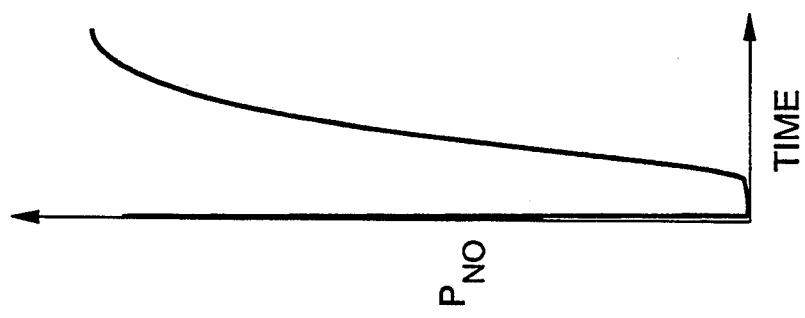
FIG._12B
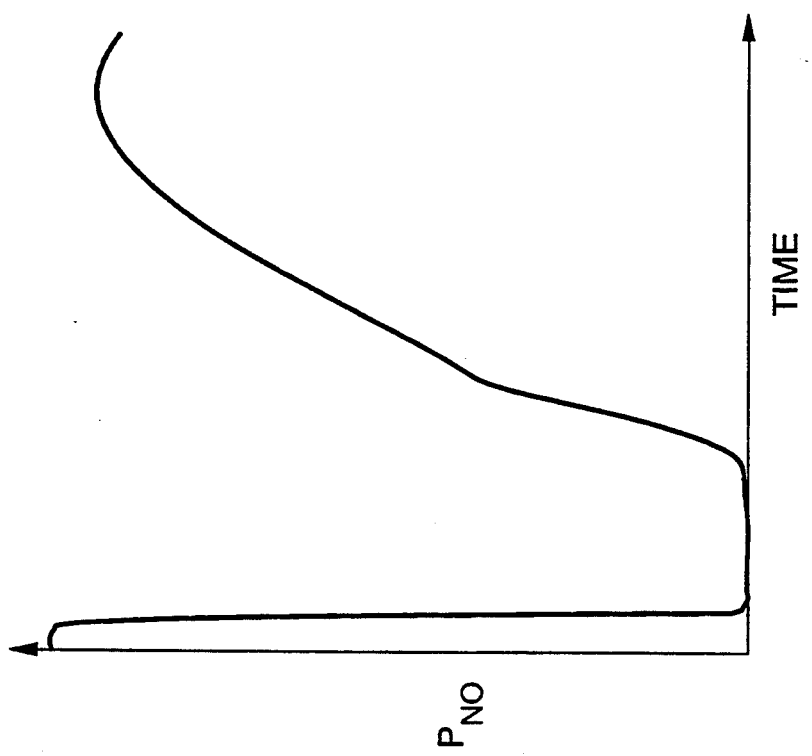
FIG._12A

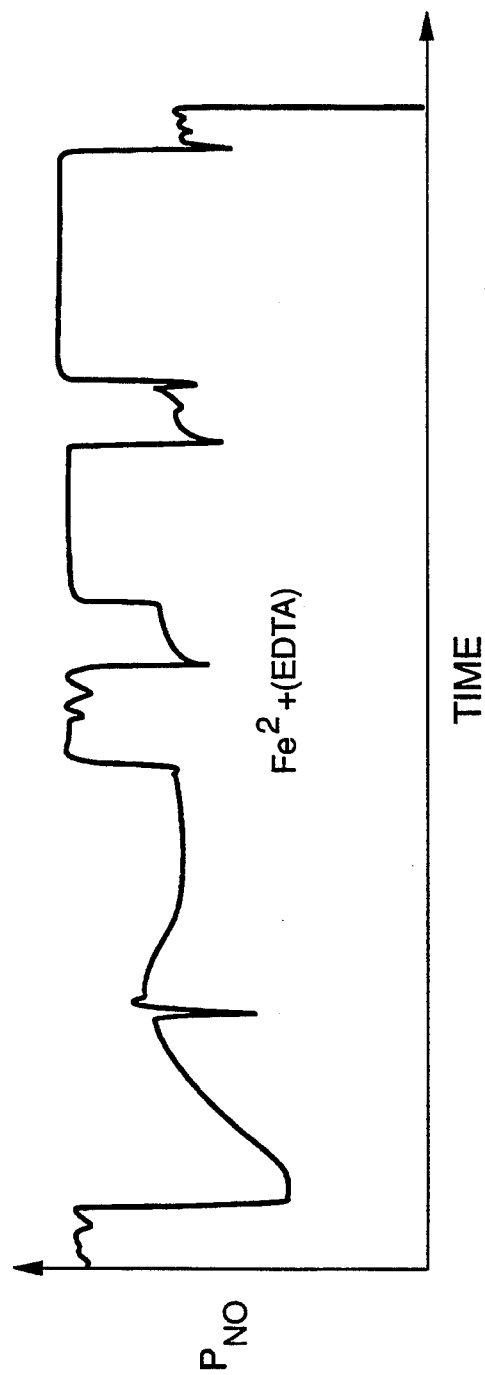
FIG._14A

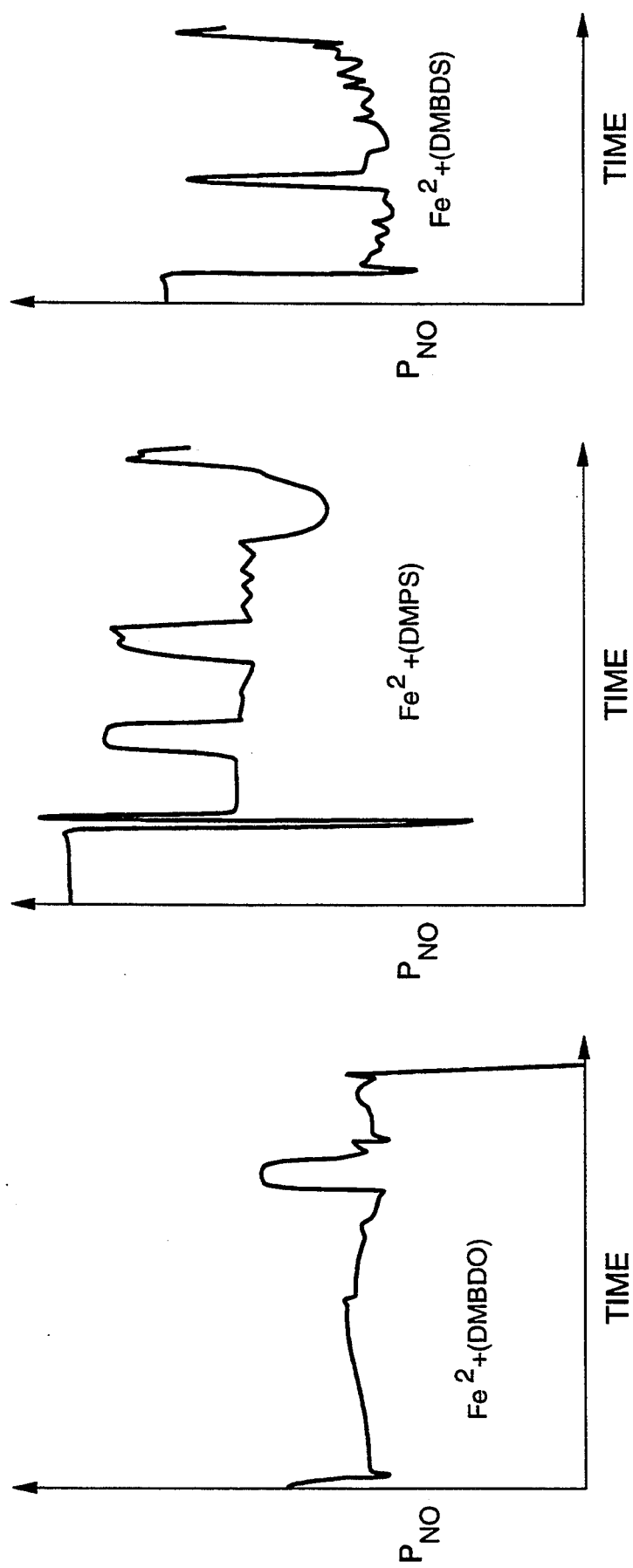

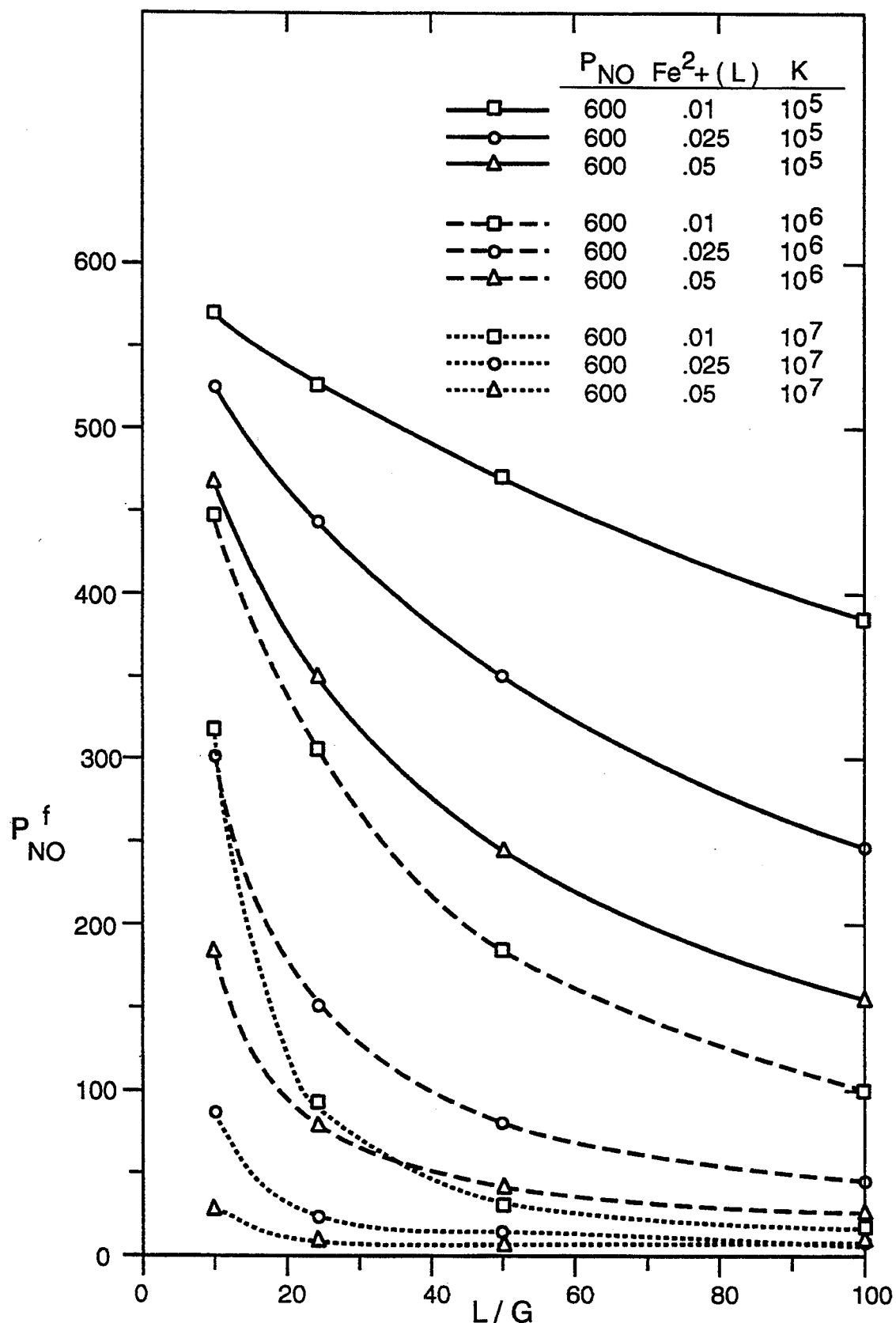
FIG._15

METAL CHELATE PROCESS TO REMOVE POLLUTANTS FROM FLUIDS

ORIGIN OF THE INVENTION

The present invention was made, in part, under a Department of Energy Contract No. DE-AC03-76SF00098. The U.S. Government has specific rights in this invention.

BACKGROUND OF THE INVENTION

1. Field Of The Invention

The present invention relates to a process for the removal of pollutants from a fluid. Specifically, the improved process relates to the contacting of a gas comprising $NO_x$ with an aqueous solution of a ferrous salt and a ligand having at least two mercapto groups. The ligand is also useful to remove hazardous metal ions from an aqueous solution.

Nitrogen oxides ($NO_x$), which includes nitric oxide (NO) and nitrogen dioxide ($NO_2$), in the atmosphere causes acid rain and urban smog. Acid rain stresses and kills forest, stunts crops, creates sterile lakes, and damages buildings, causing billions of dollars in harm to the environment. In addition, $NO_x$ contributes a characteristic brown hue to urban smog and induces the formation of PAN (peroxyacetyl nitrite) and ozone. Itching eyes, coughing, chest pains and shortness of breath are the immediate health effects. Ozone may cause irreversible damage to the lungs and immune system. Ozone also causes serious injury to plant foliage.

2. Description of Related Art

Anthropogenic $NO_x$ include those from stationary sources (fossil fuel power plants, municipal incinerators, smelters, nitric acid plants, nitration plants, chemical refineries, rotary kilns, etc.) and mobile sources (automobile, diesel cars, etc.). Several $NO_x$ control technologies have been developed. These include catalytic, adsorption, and reaction (oxidation or reduction) techniques. SCR (Selective Catalytic Reaction) is the most mature technique for stationary sources to achieve a high efficiency $NO_x$ control (greater than 80%). Catalysts are subject to poison by arsenic, alkaline materials, and particulates. The use of SCR requires the disposal of spent catalysts and the consumption of ammonia. Alternatively, Thermo-denox and NOX-out processes inject ammonia and urea respectively into a boiler to reduce between 30 and 60% of $NO_x$. However, a fraction of $NO_x$ reduced is converted to $N_2O$, a greenhouse gas.

Each of the existing technologies for $NO_x$ control are subject to some drawbacks and difficulties, and there is much room for improvement. A technology which uses simple equipment, does not require the consumption of chemicals, and does not produce unwanted byproduct and/or catalyst wastes would be very desirable.

The use of metal chelates in wet scrubber systems for removal of NO from flue gas has been investigated for more than two decades. A number of metal chelates can bind NO to form nitrosyl metal complexes. The bound NO can later be converted to environmentally acceptable species. The metal chelates are then recycled. Therefore, metal chelates may be regarded as a catalyst in a wet scrubber system for the removal of NO from flue gas. This approach is very attractive because of its simplicity for integration into a wet desulfurization system. There may be no need for excessive new equipment and chemicals if an appropriate metal chelate is identified.

A well studied metal chelate is $Fe^{2+}$ ethylenediaminetetraacetic acid (EDTA); the chemistry of a wet scrubber system involving $Fe^{2+}$ (EDTA) has been examined in many laboratories. Several processes have been derived and tested at the pilot plant stages. These include for example, Asahi, Chisso, Kureha, Mitsui, Southern Calif. Edison, Saarberg-Holter-Lurgi, and Dravo Lime/US DOE approaches. However, shortcomings in each have been encountered. These include for example:

1. The rapid oxidation of ferrous ions by oxygen to inactive ferric ions and the slow regeneration rate of ferrous ion in the EDTA system which results in a low NO removal efficiency at a steady state, and 2. The production of undesirable byproducts, such as N—S compounds and $S_2O_6^{2-}$, which require additional processing steps for disposal.

Previously explored approaches include several new types of ferrous chelates: ferrous thioamino acids/peptides (U.S. Pat. No. 4,732,744) and ferrous dithiocarbamates, xanthates and thioxanthates (U.S. Pat. No. 4,810,474), which prevent the formation of some unwanted byproducts. However, drawbacks in these processes exist with these new chelates. Some of these ferrous chelates are quite sensitive to oxygen and difficult to regenerate after they are oxidized. Others lack rapid NO absorption rates. Furthermore, these chelates may be too expensive for large-scale practical application.

Flue gas may contain sulfur dioxide ($SO_2$), in addition to $NO_x$. The $SO_2$ is another major precursor of acid rain. Technologies for the removal of $SO_2$ from flue gas are well developed. Most of these technologies involve the use of an aqueous alkaline solution/slurry to absorb and neutralize the $SO_2$. These technologies are ineffective for $NO_x$ removal, because most of $NO_x$ in flue gas is NO, which is hardly soluble in aqueous solution. The modification of a wet desulfurization system to allow simultaneous $NO_x$ removal in an efficient and cost-effective manner is not available and is very desirable.

Further, the scrubbing liquors used in wet flue gas cleanup systems may be contaminated with toxic metal ions, such as arsenic, cadmium, chromium, mercury, and selenium, and are therefore unfit for discharge or disposal to the environment. An efficient and cost-effective method for the removal of these toxic metal ions from scrubbing liquors is not presently available and is also needed.

Some general and specific references in this field include, for example:

R. R. Grinstead, U.S. Pat. No. 4,708,854, issued Nov. 24, 1987.

R. R. Grinstead, U.S. Pat. No. 4,859,437 issued Aug. 22, 1989.

S.-G. Chang et al., U.S. Pat. No. 4,732,744, issued Mar. 22, 1988.

D. K. Liu et al., U.S. Pat. No. 4,810,474, issued Mar. 7, 1989.

S.-G. Chang et al., U.S. Pat. No. 4,837,361, issued Jun. 6, 1989.

S.-G. Chang et al., U.S. patent application Ser. No. 261,229, filed Oct. 21, 1988 and allowed.

S.-G. Chang et al., U.S. Pat. No. 5,106,601, issued Apr. 21, 1992.

H. W. Blanch et al., U.S. Pat. No. 5,073,575, issued Dec. 17, 1991.

S. -G. Chang et al., U.S. Pat. No. 5,108,723, issued Apr. 28, 1992.

Meyzukova et al., (1971) *Farmakol. Toksikol. (Moscow)*, Vol. 34, No. 1, pp.70-74.

(see *Chemical Abstracts*, Vol., 97223p (1972).

All of the patents, applications, articles, standards etc. cited in this application are incorporated by reference in their entirety. None of the art cited herein teaches or suggests the present invention. The present invention discloses the use of a dimercapto ligand to chelate a metal ion ($Fe^{2+}$) to remove NO and optionally $SO_2$ (with pH control) from polluted gas, e.g., flue gas, and to remove toxic metal ions from scrubbing liquors.

SUMMARY OF THE INVENTION

The present invention relates to a process for the removal of $NO_x$ from a gas containing $NO_x$ and optionally $SO_x$, which process comprises:

(a) contacting the gas containing $NO_x$ at autogenic pressure at a pH of between about 3 and 10 at a temperature between about 10° and 99° C. with an aqueous solution itself comprising:
  (i) a water-soluble ferrous salt,
  (ii) an acid or alkali to assist in maintaining the pH at between about 3 and 10,
  (iii) and a ligand able to form a ferrous ion-chelate, which ligand is selected from dimercapto containing compounds (DMC) or salts of structure I:

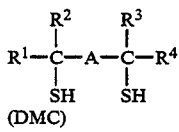

(DMC)

wherein A is independently selected from a direct bond or

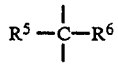

wherein $R^1$, $R^2$, $R^3$, $R^4$, $R^5$ and $R^6$ are each independently selected from hydrogen, sulfonate, sulfoxide, amine, carboxylic acid, carboxylic ester, carboxylic acid salt, hydroxyl, ether, aldehyde ketone, alkyl sulfonate, aryl sulfonate, hydroxyl amine, alkyl having 1 to 10 carbon atoms, substituted alkyl, aryl, substituted aryl, alkylenearyl, or alkylene substituted aryl, wherein the substitutions of the alkyl or aryl are each independently selected from one or more of the functional groups of mercapto, sulfonate, sulfoxide, amine, carboxylic acid, carboxylic ester, carboxylic acid salt, ether, aldehyde, ketone, alkyl sulfonate, aryl sulfonate, or hydroxyalkyl;

$R^1$ and $R^2$ together form >(C=O); or $R^3$ ad $R^4$ together form >(C=O), with the proviso that at least one of $R^1$, $R^2$, $R^3$, $R^4$, $R^5$ or $R^6$ contains a polar functional group so that the ferrous ion chelate or ferric ion chelate produced is water soluble;

(b) reducing by use of a reducing agent or by electroreducing the aqueous solution of step (a) containing $Fe^{2+}$ (DMC)NO at between about 0.2 to 20 volts at between about 0.1 and 20 amps to regenerate $Fe^{+2}$ (DMC), and (c) optionally isolating and recycling the regenerated $Fe^{2+}$ (DMC) to step (a).

In another embodiment, the present invention also relates to a process for the removal NO from a fluid containing NO which process comprises:

(a) contacting the gas containing NO at autogenic pressure at a pH of between about 3 and 10 at a temperature between about 10° and 99° C. with an aqueous solution, itself comprising:
  (i) A water-soluble ferrous salt,
  (ii) An acid or base to maintain the pH at between about 3 and 10,
  (iii) and a ligand able to form a ferrous ion-chelate, which ligand is selected from dimercapto-containing compounds (DMC') attached to the solid water-insoluble substrate:

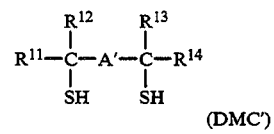

(DMC')

wherein A' is independently selected from a direct bond or

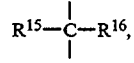

wherein $R^{11}$, $R^{12}$, $R^{13}$, $R^{14}$, $R^{15}$ and $R^{16}$ are each independently selected from hydrogen, alkyl having 1 to 10 carbon atoms, substituted alkyl, aryl, substituted aryl, alkylenearyl, or alkylene substituted aryl, wherein the substitutions of the alkyl or aryl are each independently optionally selected from one or more of the functional groups of mercapto, sulfonate, sulfoxide, amine, carboxylic acid, carboxylic ester, carboxylic acid salt, ether, hydroxyl, aldehyde ketone, alkyl sulfonate, aryl sulfonate, amine, carboxylic acid, or hydroxylalkyl;

$R^{11}$ and $R^{12}$ together form >(C=O), or $R^{13}$ and $R^{14}$ together form >(C=O), with the proviso that at least one $R^{11}$, $R^{12}$, $R^{13}$, $R^{14}$, $R^{15}$, and $R^{16}$ contains a functional group so that the ligand can be covalently bonded to a said solid water insoluble substrate, (b) reducing by use of a reducing agent or by electroreducing the aqueous solution of step (a) containing $Fe^{2+}$(DMC')NO in the presence of acid or base to maintain the pH between about 3 and 10 at between about 0.2 to 20 volts at between about 0.1 and 20 amps to produce Fe(DMC'), and (c) optionally isolating and recycling the regenerated $Fe^{2+}$(DMC') to step (a).

In another embodiment of the present invention, the process for the removal of toxic metal ions from an aqueous solution, which process comprises:

(a) contacting a ligand (DMC') of the structure:

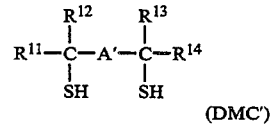

(DMC')

wherein A' is independently selected from a direct bond or

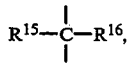

$R^{11}$, $R^{12}$, $R^{13}$, $R^{14}$, $R^{15}$ and $R^{16}$ are each independently selected from hydrogen, alkyl having 1 to 10 carbon atoms, substituted alkyl, aryl, substituted aryl, alkylenearyl, or alkylene substituted aryl, wherein the substitutions of the alkyl or aryl are each independently optionally selected from one or more of the functional groups of mercapto, sulfonate, sulfoxide, amine, carboxylic acid, carboxylic ester, carboxylic acid salt, hydroxyl, ether, aldehyde, ketone, alkyl sulfonate, aryl sulfonate, amine, carboxylic acid, or hydroxyl alkyl;

$R^{11}$ and $R^{12}$ together form $>(C=O)$, or $R^{13}$ and $R^{14}$ together form $>(C=O)$, with the proviso that at least one $R^{11}$, $R^{12}$, $R^{13}$, $R^{14}$, $R^{15}$ and $R^{16}$ contains a functional group so that the ligand can be covalently bonded to a solid water insoluble substrate, with an aqueous solution of toxic metal ions at a pH of 3 to 10, at a temperature of $+10°$ to $95°$ C. for 0.01 to 2 hr; and (b) separating the metal ion-chelate complex from the metal ion reduced aqueous solution.

BRIEF DESCRIPTION OF THE FIGURES

FIG. 1 shows a schematic representation of the equipment for a conventional gas contact process of the art.

FIG. 2 shows a schematic representation of the equipment for a conventional spray tower gas contact process of the art.

FIG. 3 shows a schematic representation of an electrochemical cell showing scrubber solution and counter ion solution.

FIG. 4A shows a graphic representation of the $P_{NO}$ absorption curve of a $Fe^{2+}$(DMPS) solution under anaerobic conditions as a function of time.

FIG. 4B shows a graphic representation of the $P_{NO}$ absorption curve of a $Fe^{2+}$(DMPS) solution under the anaerobic conditions of FIG. 4A now modified by the presence of 5% oxygen.

FIG. 5A shows a graphic representation of the $P_{NO}$ absorption curve of a $Fe^{2+}$(EDTA) solution under anaerobic conditions as a function of time.

FIG. 5B shows a graphic representation of the $P_{NO}$ absorption curve of a $Fe^{2+}$(EDTA) solution under the anaerobic conditions of FIG. 5A now modified by the presence of 5% oxygen.

FIG. 6 is a graphic representation of the stoichiometric ratio $Fe^{2+}$/NO for DMPS as a function of $Fe^{2+}$ion concentration.

FIG. 7 is a graphic representation of the stoichiometric ratio $Fe^{2+}$/NO for EDTA as a function of the $Fe^{2+}$ion concentration.

FIG. 8 is a graphic representation of the stoichiometric ratio $Fe^{2+}$/NO for DMAS as a function of pH having 5% oxygen present.

FIG. 9A shows a graphic representation of the $P_{NO}$ absorption curve for a $Fe^{2+}$(EDTA) solution under anaerobic conditions as a function of time.

FIG. 9B shows a graphic representation of the $P_{NO}$ absorption curve for a $Fe^{2+}$(EDTA) solution under the anaerobic conditions now modified by the presence of $HSO_3^-/SO_2^{2-}$.

FIG. 10A shows a graphic representation of a $P_{NO}$ absorption curve for a $Fe^{2+}$(DMPS) solution under anaerobic conditions as a function of time.

FIG. 10B shows a graphic representation of the $P_{NO}$ absorption curve for a Fe(DMPS) solution under anaerobic conditions of FIG. 10A now modified by having $HSO_3^-/SO_3^{2-}$ ion present.

FIG. 10C is a blank experiment for FIGS. 10A and 10B.

FIG. 11A is a graphic representation of a $P_{NO}$ absorption curve for a $Fe^{2+}$ (DMPS) solution under anaerobic conditions as a function of time.

FIG. 11B is a graphic representation of a $P_{NO}$ absorption curve under anaerobic conditions as a function of time with readsorption of NO.

FIG. 12A is a graphic representation of the $P_{NO}$ curve for a $Fe^{2+}$ (DMAS) solution under anaerobic conditions as a function of time under electroreduction cycle conditions.

FIG. 12B is a cycle graphic representation of FIG. 12A after the first electroreduction cycle.

FIG. 12C is a graphic representation of FIG. 12A after seven electroreduction cycles.

FIG. 13 is a graphic representation of the percentage recovery of Fe(II) DMPS as a function of electroreduction time in hr.

FIG. 14 compares the absorption efficiencies of NO by solutions containing $Fe^{2+}$(EDTA) under similar experimental conditions.

FIG. 15 is a graphic representation of $P_{NO}$ of several concentrations of $Fe^{2+}$(L) as a function of the volumetric ratio (L/G) of scrubbing liquor to flue gas.

DETAILED DESCRIPTION OF THE INVENTION AND PREFERRED EMBODIMENTS

Ferrous ions possess excellent properties for NO removal after forming coordination compounds with organic chelates which feature a moiety of two mercapto (thiol) groups either bonded to two adjacent carbons (see Formula 1 below) or bonded to two carbons, one of which is one carbon removed from the other (See Formula 2 below). In addition, the chelates should contain at least one functional group, preferably a sulfonate group, that polarizes the molecule for application in a water soluble system. The polar structure ensures the high solubility of the complexes after the coordination with ferrous ions and the absorption of NO.

$R^1$—$CR^2(SH)$—$CR^3(SH)$—$R^4$ Formula 1

$R^1$—$CR^2(SH)$—$CR^5(R^6)$ —$CR^3(SH)$—$R^4$ Formula 2 wherein each $R^1$, $R^2$, $R^3$, $R^4$, $R^5$, or $R^6$ is independently a hydrogen; an alkyl group; an aryl group; a sulfonate group; an amine group; a carboxylic acid group; a hydroxyl group; an aldehyde group; a ketone group; a hydroxyalkyl group; an alkyl or an aryl group containing mercapto, sulfonate, sulfoxide, amine, carboxylic ester, carboxylic acid or salt, ether, aldehyde, or ketone groups; wherein at least one $R^1$, $R^2$, $R^3$, $R^4$, $R^5$, or $R^6$ is a functional group that can polarize the chelates for application in a soluble system.

Examples of the "Formula 1" compounds include:

2,3-dimercapto-1-propanesulfonate (DMPS) 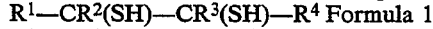
$(HSCH_2CH(SH)CH_2SO_3^-)$;

2,3-dimercapto-1,4-butanedisulfonate (DMBDS) 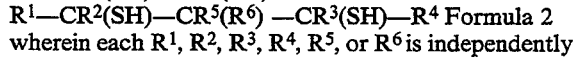
$(^-O_3SCH_2$—$CH(SH)CH(SH)CH_2SO_3^-)$, 1,2-dimercapto-3,4-butanedisulfonate (1,2-DMBS)
[HSCH$_2$CH(SH)CH(SO$_3^-$)CH$_2$SO$_3^-$];
p-1,2-dimercapto-ethyl-benzenesulfonate (DEBS)
(HSCH$_2$CH(SH)C$_6$H$_4$SO$_3^-$);
p-(dimercaptopropoxy)benezenesulfonate (DMPBS)
(p-HSCH$_2$CH(SH)CH$_2$OC$_6$H$_4$SO$_3^-$);
2,3-dimercapto-1,4-butanediol (DMBDO)
(HOCH$_2$CH(SH)CH(SH)CH$_2$OH); or
dithiooxalate(DTO) OC(SH)C=O(SH).

Examples of the "Formula 2" compound include
1,3-dimercapto-2-propanesulfonate (1,3-DMPS)
(HSCH$_2$)$_2$CHSO$_3^-$.

These sulfonate groups not only ensure the high water solubility of the complexes, but also decrease the volatility of the compounds.

In different applications, ferrous chelates may be localized (adsorbed, covalently bonded, etc.) onto solid surfaces for the absorption of NO. Under such circumstances, the dimercapto group structure may be bonded (or adsorbed upon) to a solid, such as an organic compound, a polymer, a membrane, or a resin. It is not necessary for the polar groups to be a part of the solid structure under this situation. However, the condition that at least two mercapto groups of the chelates are separated by either two carbons (Formula 1) or three carbons (Formula 2) still must be satisfied. Chelates featuring a moiety of two or more mercapto (thio) groups located two or three carbons away, including the soluble as well as the insoluble cases, are termed Dimercapto Chelates (DMC) in the following discussions herein.

The dimercapto-containing compounds when coordinated with a metal ion, preferably a ferrous ion form Fe$^{2+}$(DMC) chelate. These chelates are very effective for the absorption of NO from flue gas. The resulting Fe$^{2+}$(DMC)NO is converted back to Fe$^{2+}$(DMC) for recycling by either an electroreduction and/or a chemical reaction method. The bound NO is reduced to N$_2$O, N$_2$, NH$_3$+OH, and/or NH$_4^+$ in cases where the electroreduction method is used. The N$_2$O and N$_2$ evolved from the electroreduction cell may be cycled back to a boiler or a combustion source with a stream of purge steam and/or gas. This step prevents N$_2$O, a greenhouse gas, from being released to the atmosphere. The NH$_3$+OH and NH$_4^+$may be separated from the scrubbing liquors by a conventional separation method. In the case where a chemical reaction method is used, the bound NO is reduced by a compound containing a thiol group, such as cysteineamine to a mixture of N$_2$ and N$_2$O which gases may be treated by the methods described above. The oxidized form of thio-containing compounds is readily reduced to the original form by an electroreduction method. Thus, both Fe$^{2+}$(DMC) and thio-containing compounds can be regenerated by the electroreduction method.

Flue gas normally contains 1 to 10 volume % O$_2$, which can oxidize ferrous ion to inactive ferric ion. DMC effectively reduces ferric to ferrous ion, while DMC is converted to the oxidized form (containing an —S—S— linkage). The oxidized form of DMC may be reduced to the original form of DMC by the electroreduction method. The oxidized form of DMC does not coordinate ferric and ferrous ions effectively. In order to prevent ferric and/or ferrous ions from precipitating as hydroxide or oxide salts in cases wherein all DMC is oxidized, a secondary chelating compound, such as a sodium citrate, having a weaker stability constant than the corresponding DMC toward ferrous ion, may be added in the scrubber solution. This addition keeps ferric and/or ferrous ions soluble by forming complexes with them until the DMC is regenerated.

In addition, a three-phase heterogeneous system for the cleanup of NO from flue gas may be developed. The aforementioned dimercapto groups may be synthesized (or covalently bonded) onto a solid surface, such as a polymer, a resin, or a membrane or tightly bound to the surface of a solid support. These solid substrates may be immersed in a solution or deposited with a thin surface layer of an aqueous film. After the coordination of a ferrous ion on the dimercapto groups, the solid materials are expected to absorb NO from a gas stream. Subsequent steps in the disposal of the bound NO and the regeneration of active sites may be achieved as described in a homogeneous soluble system.

A Fe$^{2+}$(DMC) chelate may be used as an additive in wet desulfurization scrubbers for combined removal of SO$_2$ and NO$_x$ from flue gas. The wet desulfurization scrubbers use alkaline materials including limestone, lime, thiosorbic lime, magnesium carbonate and oxide, dolomite, soda ash, caustic soda, sodium sulfite, and amines. The alkaline solution is responsible for the removal of SO$_2$ and NO$_2$, while Fe$^{2+}$(DMC) is responsible for the absorption of NO. The treatment of the absorbed NO and the regeneration of Fe$^{2+}$(DMC) for recycling are similar to those described above.

The application of the dimercapto compounds for the abatement of NO$_x$ and SO$_2$ is extended. A molecule consisting of both of the aforementioned dimercapto moiety and an amine moiety is synthesized for combined removal of NO$_x$ and SO$_2$ from flue gas. The amine moiety is composed of at least one primary, secondary, and/or tertiary amine group. The amine moiety may be in the form of a salt or a functional group having Pka of 4–7.5. The amine moiety plays a role in absorbing SO$_2$ and forming an amine bisulfite salt. The amine bisulfite salt formation is a reversible reaction. Therefore, the amine moiety can be thermally regenerated to remove the SO$_2$. A stream of high concentration SO$_2$ is produced. The SO$_2$ is converted to elemental sulfur or sulfuric acid using a conventional commercial process. On the other hand, the dimercapto moiety in the molecules plays the role of absorbing NO after coordination with ferrous ions as described.

Toxic Metal Ion Coordination

Moreover, the dimercapto compounds are used to remove toxic metal ions from scrubbing liquors through the coordination process. These metal ions include, for example, arsenic, cadmium, chromium, mercury, selenium, etc. The stability constants of dimercapto compounds (DMC) with metal ions are very large. Consequently, the removal efficiency is very high. Again, the dimercapto moiety may be contained (adsorbed, covalently bonded to) in a solid, such as a polymer, a resin, or a membrane. The separation of the solid dimercapto compounds saturated with metal ions from scrubbing liquors may be done by a conventional liquid-solid separation technique, such as precipitation, filtration, etc. The dimercapto containing adsorbent is regenerated by an ion-exchange method.

Dimercapto Compound Attached to a Solid Substrate

The dimercapto moiety attached to a solid substrate DMC of the present invention also includes those DMC structures wherein the polar functional group is not present and the DMC is covalently bonded (or occluded to, adsorbed upon) a substrate which is water insoluble. Further, the combination of the DMC-solid substrate is also water insoluble.

It is possible to obtain these water insoluble macromolecules by attaching the dimercapto group to a particle or article of polystyrene (or a polystyrene derivative as is described by H. Blanch et al., U.S. Pat. No. 5,073,575. The other coupling reactions described in Blanch et al. are also utilized.

Similarly to produce water insoluble DMC moieties it is possible to adapt the preparations of R. R. Grinstead of U.S. Pat. Nos. 4,859,437 or 4,708,854.

The water insoluble DMC moiety is a covalently bonded macromolecule.

Further it is possible to adapt the coupling reactions described by M. Goodman, et al., in U.S. Pat. No. 4,687,873, wherein the DMC is covalently bonded to a macromolecule through a linking group.

General Synthesis Of Some DMC Compounds 2,3 - DMBDS (a) A 1,4-Dibromo-2-butene is added to an aqueous solution of sodium sulfite. This mixture is stirred at between about 40° to 90° C., preferably about 60° C., until the organic phase disappears and a clear aqueous solution is obtained. This solution is evaporated to obtain a solid mixture of 2-butene-1,4-disulfonate and sodium bromide.

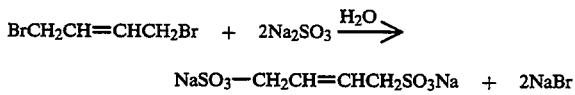

(b) Dibromodesulfonate

Acetic acid is added to the solid mixture to dissolve the 2-butene-1,4-disulfonate. Subsequently, bromine is added dropwise to the solution at between about 0° to 30° C. to produce 2,3-dibromo-1,4-butane disulfonate.

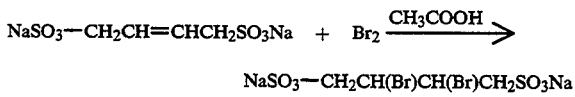

The solution is concentrated under reduced pressure. Ether is added to the solution to precipitate the dibromide product, which sometimes contains a trace amount of NaBr. The dibromide product is purified by recrystallization using isopropanol.

(c) Dithiodisulfonate

Sodium hydrogen sulfide is added to an aqueous solution of 2,3-dibromo-1,4-butane disulfonate in a reaction flask. The aqueous mixture is stirred and undergoes rection to produce crude 2,3-DMBDS.

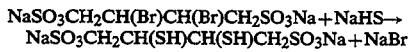

The crude 2,3-DMBDS is purified with the following sequential steps: (1) the excess NaHS is removed by acidification of the solution with hydrochloric acid to evolve $H_2S$. The solution is continuously bubbled with carbon dioxide to strip the remaining hydrogen sulfide from the solution. (2) Lead acetate is added to precipitate the complexes of lead 2,3-DMBDS, which is separated from the solution. (3) The 2,3-DMBDS is dissolved in a concentrated sulfuric acid (20%) aqueous solution. (4) Vacuum evaporization to obtain the sodium salt of 2,3-MBDS, after the neutralization of the solution by $Na_2CO_3$, and (5) extraction of 2,3-DMBDS with alcohol, followed by recrystallization from alcohol to obtain the disodium salt of 2,3-DMBDS.

1,2-DMBDS

The synthesis procedure for 1,2-DMBDS is similar to 2,3-DMBDS.

(a) 3,4-Dichloro-1-butene is added to an aqueous solution of sodium sulfite at about 40° to 70° C. to produce 1-butene-3,4-disulfonate.

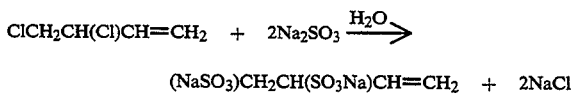

(b) Bromine is slowly added dropwise to an acetic acid solution of 1-butene-3,4-disulfonte at between about ambient temperature to produce 1,2-dibromobutane-3,4-disulfonte.

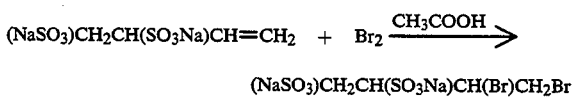

(c) Sodium hydrogen sulfide is contacted with an aqueous solution of 1,2-dibromobutane-3,4-disulfonate at about ambient temperature to form 1,2-DMBDS.

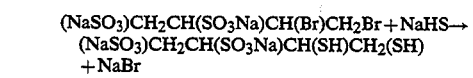

The purification of 1,2-DMBDS was performed according to those described above for 2,3-DMBDS.

Other DMC are prepared by adapting this synthesis route.

Results And Discussions

The NO absorption capacity of several ferrous dimercapto chelates studied is larger than that of $Fe^{2+}$-(EDTA) under the same experimental conditions. FIG. 4A shows the NO absorption curve of a $Fe^{2+}$(DMPS) solution under anaerobic conditions. 10 mM $Fe^{2+}$(DMPS) absorbs 7.5mM of NO from a simulated flue gas containing 580 ppm NO at 55° C. and pH of 6.6. This corresponds to an equilibrium constant of more than $1.5 \times 10^7$ $M^{-1}$. In the presence of 5% oxygen, the amount of NO absorbed decreases to 3.3 mM (FIG. 4B), a 56% reduction from the anaerobic condition. For a comparison, FIG. 5A shows that 10 mM $Fe^{2+}$(EDTA) absorbs 2.6 mM of NO from a flue gas containing 575 ppm NO at 55° C. and pH of 5.9 under anaerobic conditions. This corresponds to an equilibrium constant of $1.0 \times 10^6$ $M^{-1}$. In the presence of 5% oxygen, the amount of NO absorption decreases to only 0.44 mM (FIG. 5B), an 83% reduction from the anaerobic conditions. Therefore, $Fe^{2+}$(DMPS) absorbs more than 2.5 times NO than $Fe^{2+}$ (EDTA) under anaerobic conditions, and 7.5 times more NO in the presence of 5% oxygen. A stoichiometric ratio, $Fe^{2+}$/NO (the molar ratio of $Fe^{2+}$ to NO absorbed) is used to measure the effectiveness of metal chelate utilization. The smaller the stoichiometric ratio, the more effective the metal chelate. FIGS. 6 and 7 show this stoichiometric ratio as a function of ferrous concentration, for $Fe^{2+}$(DMPS) and $Fe^{2+}$(EDTA) respectively, under simulated flue gas conditions ($P_{NO}$ about 550 ppm oxygen, oxygen=5%, and pH is 5.5 to 6). The results indicate that $Fe^{2+}$(DMPS) becomes even more effective than $Fe^{2+}$(EDTA) in NO absorption in the presence of oxygen with an increase in the concentration of ferrous chelates. The absorption capacity of $Fe^{2+}$(DMPS) is more than 10 times that of $Fe^{2+}$(EDTA) at [$Fe^{2+}$]=50 mM.

The pH dependence on the NO absorption by $Fe^{2+}$(DMC) solutions was examined. Under anaerobic conditions, the NO absorption capacity of an $Fe^{2+}$(DMPS) solution remains the same in the pH range (4 to 9) studied. In the presence of 5% oxygen, the NO absorption capacity improves slightly as the pH of solutions decrease from 9 to 4. This is attributed to slower oxidation rate of ferrous ions by oxygen at low pH conditions. FIG. 8 shows that in the presence of 5% oxygen in a gas mixture containing 529 ppm NO and when 4 times as much [DMPS] as [ferrous ions] was used in a solution, the molar ration of [$Fe^{2+}$] to [NO] absorbed $n_{Fe(II)}/n_{NO}$, decreases from 2.75 to 1.5 with decreases of pH from 8.75 to 4.25.

The oxygen in a flue gas may oxidize ferrous to ferric ions, which are then inactive in NO absorption. Surprisingly, DMC effectively reduces the ferric back to ferrous ions. Table 1 below shows that the addition of DMPS to a ferric sulfate solution can make the solution effective for NO absorption. This is attributed to the ability of DMPS to reduce ferric ions to ferrous ions. The oxidized form of DMPS is readily converted to the original DMPS form by an electroreduction method.

TABLE 1

The use of a ferric solution for the absorption of NO at 55° C.

| $P_{NO}$ ppm | $O_2$ % | pH | [$Fe^{3+}$] mM | [DMPS] mM | [DMPS]/ [$Fe^{3+}$] | [NO]$_{abs}$ mM | [$Fe^{3+}$]/ [NO] |
|---|---|---|---|---|---|---|---|
| 525 | 0 | 5.5 | 5 | 20 | 4 | 4.54 | 1.10 |
| 480 | 0 | 5.9 | 5 | 10 | 2 | 2.43 | 2.06 |
| 630 | 4.3 | 4.9 | 5 | 20 | 4 | 2.27 | 2.20 |
| 500 | 5 | 5.8 | 5 | 20 | 4 | 1.95 | 2.56 |
| 530 | 5.4 | 5.6 | 10 | 40 | 4 | 3.87 | 2.58 |

The fate of NO after absorption is a major environmental concern. The bound NO in nitrosyl ferrous chelates must be removed to regenerate ferrous chelates for recycling. In the case of an EDTA system, the bound NO is removed from $Fe^{2+}$(EDTA)NO by reaction with $HSO_3^-/SO_3^{2-}$. However, various nitrogen-sulfur compounds are produced as a result. FIG. 9A shows that 10 mM $Fe^{2+}$(EDTA) reached equilibrium with a gas mixture containing 575 ppm NO to produce 2.35 mM $Fe^{2+}$(EDTA)NO at 55° C. and pH of 5.8. The solution was saturated with NO. However, after the solution was allowed to react with 20 mM $HSO_3^{2-}$ at 55° C. for 5 min, it resumed absorption of NO as shown in FIG. 9B. This result is due to the reaction of $HSO_3^-/SO_3^{2-}$ with the bound NO to regenerate $Fe^{2+}$(EDTA). However, the nitrogen-sulfur compounds were produced as a result. These nitrogen-sulfur compounds include hydroxylamine disulfonate, hydroxylamine monosulfonate, amine trisulfonate, amine disulfonate, and sulfamate. All of these compounds are very soluble in water, which makes their disposal difficult. Methods for separation of these compounds from scrubbing liquors include precipitation as potassium salts (Asahi Chemical's process) and hydrolysis under acid-catalyzed conditions to form ammonium bisulfite (MHI process). Both of these methods are cumbersome and expensive. The complications associated with the disposal of these nitrogen-sulfur compounds increases the overall economics of the technology and retards its commercialization prospects for flue gas cleaning.

On the contrary, the present invention demonstrates that the bound NO in $Fe^{2+}$(DMC)NO is much less reactive with $HSO_3^-/SO_3^{2-}$. Therefore, the formation of nitrogen-sulfur compounds is largely prevented. FIG. 10A shows that 4 mM $Fe^{2+}$(DMPS)NO was produced after exposure of 5 mM $Fe^{2+}$(DMPS) with a gas mixture containing 480 ppm NO. Then, after the 4 mM Fe(DMPS)NO was allowed to react with 10 mM $HSO_3^-/SO_3^{2-}$ at 55° C. for 10 min, the solutions did not resume the absorption of detectable amounts of NO when treated with a NO containing gas mixture (FIG. 10B). FIG. 10C shows the result of a blank experiment, a seemingly small absorption area that can be attributed to the entrance of room air (free of NO) into the system during the process of $HSO_3^-/SO_3^{2-}$ addition.

Nevertheless, the bound NO should be removable from the $Fe^{2+}$(DMC)NO in order to regenerate $Fe^{2+}$(DMC) for recycling. The present invention shows that the bound NO in $Fe^{2+}$(DMC)NO reacts with a thiol compound. FIG. 11A shows that 3.4 mM of $Fe^{2+}$(DMPS)NO was produced after the saturation of a 5 mM $Fe^{2+}$(DMPS) solution with a gas mixture containing 490 ppm NO at 55° C. and pH of 5.7. Subsequently, the solution was allowed to react with 10 mM cysteamine at 55° C. for 5 min, followed by bubbling the aforementioned NO containing gas mixture through the solution. The solution reabsorbs NO (FIG. 11B) which indicates removal of NO from the complexes and the regeneration of $Fe^{2+}$(DMPS). The degree of regeneration is increased along with an increase of reaction time and temperature and/or the concentration of cysteamine.

Another method of regeneration of $Fe^{2+}$(DMC) from $Fe^{2+}$(DMC)NO involves the electroreduction of the bound NO. The present invention shows that the process of NO absorption by $Fe^{2+}$(DMC) solutions in the presence of oxygen can be repeated several days using an electroreduction method to regenerate the scrubbing solutions. When an NO saturated and oxygen oxidized Fe(DMPS) solution (FIG. 12A) was electroreduced at an applied voltage of 10 V and a current of 0.1 to 0.5 Amp for a period of 2 hr, the recycled scrubber solution exhibited a recovery of NO absorption ability. FIG. 12B and 12C shows the absorption profiles obtained from the regeneration of the scrubbing liquors by electroreduction after the first and seventh cycles, respectively. These results show a consistent regeneration of 27% under the conditions employed. The time-dependence regeneration of scrubbing liquors by the electroreduction method was investigated. An aqueous solution containing 50 mM $Fe^{2+}$ (DMPS) was exposed to a gas mixture of 570 ppm NO, 5% oxygen, and the balance nitrogen at 55° C. The spent liquors were regenerated repeatedly by the electroreduction method at 90° C. as a function of time. As illustrated in FIG. 13, the regeneration of the active catalyst $Fe^{2+}$(DMPS) increases with electroreduction time, with nearly 60% of the scrubbing liquor regenerated after an overnight electrolysis of 17 hr. The NO electroreduction process remains to be optimized. This may be achieved by increasing the surface areas of electrodes, by using better electrode materials, and by conducting the electrolysis at elevated temperatures in order to increase the current density at a given voltage.

The kinetics of NO absorption by several $Fe^{2+}(DMC)$ solutions are comparable to that by $Fe^{2+}$-(EDTA). FIG. 14 compares the absorption efficiencies of NO by solutions containing $Fe^{2+}(EDTA)$ with three different $Fe^{2+}(DMC)$ moieties, e.g., $Fe^{2+}(DMBDO)$, $Fe^{2+}(DMPS)$, and $Fe^{2+}(DMBDS)$ under very similar experimental conditions. The experiments were carried out using a bench-scale spray tower scrubber. The NO removal efficiency of $Fe^{2+}(EDTA)$ was about 60% in the beginning, but rapidly decreased to between 25 and 30% at the steady state, while the NO removal efficiency ranged between 30 and 55% depending on the $Fe^{2+}(DMC)$ used. The NO absorption rate follows the order: $Fe^{2+}(DMBDS) > Fe^{2+}(DMPS) > Fe^{2+}(DMBDO)$. The NO removal efficiency in $Fe^{2+}(DMC)$ systems were not sensitive to the presence of $HSO_3^-/SO_3^{2-}$ in the solutions, and did not decay with time as rapidly as in the $Fe^{2+}(EDTA)$ system. The NO removal efficiency may be improved by increasing the concentration of ferrous chelates in solutions and/or by increasing gas-liquid contacts.

In principle, increasing the gas/liquid contact improves the removal efficiency of NO. However, there is a limit to the NO removal efficiency achievable based on thermodynamic considerations. FIG. 15 shows that this limit depends on the concentration of metal chelate in solutions, NO absorption equilibrium constants, and the volumetric ratio (L/G) of scrubbing liquor to flue gas. For example, if a flue gas containing 600 ppm NO is scrubbed with a solution containing 25 mM of active $Fe^{2+}(EDTA)$ and at a L/G (gallons/1000 cu-ft) of 25, the best achievable final NO concentration is 150 ppm, i.e., a 75% NO removal efficiency, since the equilibrium constant of NO with $Fe^{2+}(EDTA)$ is about $1 \times 10^6 M^{-1}$ at 55° C. However, the NO removal efficiency can reach 96% under identical conditions as described above if $Fe^{2+}(DMPS)$ is employed, because the equilibrium constant of NO with $Fe^{2+}(DMPS)$ is $1.5 \times 10^7 M^{-1}$ at 55° C.

In summary, an aqueous mixture of a ferrous salt, a base or acid, a dimercapto compound mentioned above, and a secondary chelating compound, such as a citrate salt, is formulated for an effective removal of NO individually or simultaneously with $NO_2$ and $SO_2$ from polluted gas, e.g., flue gas. The above formulation may include a reductant such as a thiol compound or $S_2O_4^{2-}$ when a chemical reaction method is chosen for regeneration of $Fe^{2+}(DMC)$ from $Fe^{2+}(DMC)NO$. The combination of a chemical reaction method for regenerating $Fe^{2+}(DMC)$ from $Fe^{2+}(DMC)NO$, and an electroreduction method for regenerating DMC from their oxidized form (containing —S—S—) is a cost-effective route. The absorbed NO is converted to $N_2$, $N_2O$, $NH_3+OH$, and/or $NH_4+$ or to $N_2$ and $N_2O$ depending on the regeneration method employed. $N_2O$ is thermodecomposed by cycling it to a combustion source.

Process Applications

Several applications are derived from the use of the aforementioned dimercapto containing compounds to cleanup flue gas pollutants either individually or simultaneously. These pollutants include NO, $SO_2$, or toxic metal ions such as arsenic (As), mercury (Hg), cadmium (Cd), chromium (Cr), or selenium (Se). A few of these applications are described as follows:

Cleanup Of NO

The dimercapto containing compounds of the present invention, when coordinated with a metal ion especially a ferrous ion, e.g., forming $Fe^{2+}(DMC)$ are very effective for absorption of NO from flue gas as described above. The resulting $Fe^{2+}(DMC)NO$ is converted back to $Fe^{2+}(DMC)$ for recycling by either an electroreduction and/or a chemical reaction method. The bound NO is reduced to $N_2O$, nitrogen, $NH_3+OH/NH_3$, and/or $NH_4+$ in cases where the electroreduction method is used. The $N_2O$ and nitrogen evolved from the electroreduction cell is cycled back to a boiler or a combustion source with a stream of purge steam and/or gas. This step prevents $N_2O$, a greenhouse gas, from being released to the atmosphere. The $NH_3^{30} OH$ and $NH_4+$ can be separated from the scrubbing liquors by a conventional separation method. In the case when a chemical reaction method is used, the bound NO is reduced by a reducing agent such as a compound containing a thiol group, for example cysteamine, to nitrogen and/or $N_2O$, which are treated by the method described above. The oxidized form of thiol-containing compounds is readily reduced to the original form by electroreduction method. Thus, both $Fe^{2+}(DMC)$ and thio-containing compounds are regenerated by the electroreduction method. Other reducing agents, such as $S_2O_4^{2-}$ are also feasible for the regeneration of $Fe^{2+}(DMC)$ from $Fe^{2+}(DMC)NO$.

Flue gas normally contains 1 to 10% $O_2$, which oxidizes ferrous to inactive ferric ions. DMC effectively reduces ferric to ferrous ions, while DMC is converted to the oxidized form (containing a —S—S— linkage) as discussed. The oxidized form of DMC is reduced to the original form of DMC by the electroreduction method. The oxidized form of DMC does not coordinate ferric and ferrous ions effectively. In order to prevent ferric and/or ferrous ions from precipitation as hydroxide or oxide salts under the conditions when most of the DMC is oxidized, a secondary chelating compound, such as a sodium citrate, with a weaker stability constant than the corresponding DMC toward ferrous ion, may be added in the scrubber solution to keep ferric and/or ferrous ions soluble by forming complexes with them during the regeneration of DMC.

In addition, a three-phase heterogeneous system for the cleanup of NO from flue gas may be developed. The again dimercapto groups may be synthesized (adsorbed, covalently bonded, etc.,) onto a solid surface, such as a polymer, a resin, or a membrane. These substrates may be immersed in a solution or deposited with a thin surface layer of an aqueous film. After the coordination of a ferrous ion on the dimercapto groups, the solid materials are expected to absorb NO from a gas stream. Subsequent steps in the disposal of the bound NO and the regeneration of active sites may be achieved as described in a soluble system.

Simultaneous Cleanup Of $NO_x$ And $SO_2$

An $Fe^{2+}(DMC)$ may be used as an additive in wet desulfurization scrubbers for combined removal of $SO_2$ and $NO_x$ from flue gas. The wet desulfurization scrubbers use alkaline materials including limestone, lime, thiosorbic lime, magnesium carbonate and oxide, dolomite, soda ash, caustic soda, sodium sulfite, and amines. The alkaline solution is responsible for the removal of $SO_2$ and $NO_2$, while $Fe^{2+}(DMC)$ is responsible for the absorption of NO. The treatment of the absorbed NO and the regeneration of $Fe^{2+}$(DMC) for recycling are similar to those described in the process applications above.

A molecule comprising both the aforementioned dimercapto moiety and an amine moiety may be synthesized for combined removal of $NO_x$ and $SO_2$ from flue gas. The amine moiety is composed of at least one primary, a secondary, and/or a tertiary amine groups. The amine moiety may be in the form of a salt or a functional group having a Pka of 4 to 7.5. The amine bisulfite salt formation is a reversible reaction. Therefore, the amine moiety is thermally regenerated to remove the $SO_2$. A stream of high concentration $SO_2$ is produced. The $SO_2$ is converted to elemental sulfur or sulfuric acid using a commercial process. On the other hand, the dimercapto moiety in the molecules plays the role of absorbing NO after coordination with ferrous ions as discussed above.

Cleanup Toxic Metal Ions

The dimercapto compounds are also used to remove toxic metal ions from scrubbing liquors through the coordination process. These metal ions include, for example, arsenic, cadmium, chromium, mercury, selenium, etc. The stability constants of dimercapto compounds with metal ions are very large. Consequently, the removal efficiency is very good. The dimercapto moiety may be contained in or on a solid such as polymer, resin, or a membrane. The separation of the solid dimercapto compounds saturated with metal ions from scrubbing liquors can be done by a conventional liquid-solid separation technique, such as precipitation, filtration. The dimercapto containing adsorbent can be regenerated by an ion-exchange method known in the art.

The present invention claims that ferrous dimercapto complexes, $Fe^{2+}$(DMC), possess excellent properties for the removal of NO from flue gas. These properties include:
1. a large NO absorption capacity;
2. A fast rate of NO absorption;
3. resistance to oxidation by oxygen in flue gas;
4. suppressed formation of unwanted byproducts, and
5. easy regeneration of adsorbents.

The $Fe^{2+}$(DMC) is regenerated from $Fe^{2+}$(DMC)NO for recycling by either an electroreduction and/or a chemical reaction method. The bound NO is reduced to $NH_4^+$, $NH_3^+OH$, $N_2$ and/or $N_2O$. The latter is cycled back to a combustion source for decomposition. An $Fe^{2+}$(DMC) complex is used as an additive in wet desulfurization scrubbers for combined removal of $SO_2$ and $NO_x$ from flue gas. In addition, a molecule consisting of both a dimercapto group mentioned above and an amine group is synthesized for combined removal of $NO_x$ and $SO_2$ from flue gas. The amine moiety plays a role in absorbing $SO_2$ and forming an amine bisulfite salt. The amine bisulfite salt formation is a reversible reaction. Therefore, the amine moiety is thermally regenerated to remove $SO_2$. A stream of high concentration $SO_2$ is produced. The $SO_2$ is converted to elemental sulfur or to sulfuric acid using a commercial process. On the other hand, the dimercapto moiety in the molecules plays the role of absorbing NO after coordination with ferrous ions as discussed above.

The following Examples are presented to be descriptive and explanatory only. They are not to be construed as being limiting in any way.

Materials—Most of reagents used in this study were commercially available and were used as received. The chemicals and reagents are available from chemical supply houses, such as Aldrich Chemicals, Milwaukee, Wis. or sources are identified from *Chemical Sources U.S.A.* published annually by Directories Publishing, Inc. of Boca Ratan, Fla. These include: 2,3-dimercapto-1-propanesulfonate (DMPS), dithiooxalate (DTO), 2,3-dimercapto-1,4-butanediol (DMBDO), 2,3-dimercaptosuccinate (DMSC), cysteamine.HCl (2-aminoethanethiol.hydrochloride), sodium citrate dihydrate, ethylenediaminetetraacetic acid (EDTA), $Fe(NH_4)_2(SO_4)_2.6H_2O$; $FeCl_2.4H_2O$; $FeCl_3$, $Na_2B_4O_7.10H_2O$, $Na_2SO_3$, $Na_2SO_4$, NO gas(2.5% in $N_2$), NO standard gas (680 ppm in $N_2$), $O_2$, and $N_2$ gas.

Some compounds of interest, with the aforementioned "dimercapto groups" moiety, were not available commercially. Some of them were synthesized. These include 2,3-dimercapto-1,4-butanedisulfonate and 1,2-dimercapto-3,4-butanedisulfonate.

EXAMPLE 1

2,3-Dimercapto-1,4-butanedisulfonate (2,3-DMBS).

1,4-dibromo-2-butene is added to an aqueous solution of sodium sulfite at 60° C. This mixture is stirred using a magnetic stirrer at 60° C. until the organic phase disappeared, and a clear aqueous solution is obtained. This solution is evaporated to obtain a solid mixture of 2-butene-1,4-disulfonate and sodium bromide.

Acetic acid is added to the solid mixture ambient temperatures to dissolve 2-butene-1,4-disulfonate. Subsequently, bromine is added dropwise to the solution at between 10°–15° C. to produce 2,3-dibromo-1,4-butane disulfonate. The solution is concentrated under reduced pressure. Diethyl ether is added to the solution to precipitate the dibromide product, which may contain a trace amount of NaBr. The dibromide product is purified by recrystallization using isopropanol.

Sodium hydrogen sulfide is added to an aqueous solution of 2,3-dibromo-1,4-butane disulfonate at ambient temperature in a flask. This aqueous mixture is stirred and undergoes a reaction to produce 2,3-DMBDS.

The 2,3-DMBDS is purified with the following sequential steps:
1. removal of excess NaHS by acidification of the solution with acetic acid to evolve $H_2S$; the solution was continuously bubbled with carbon dioxide to strip the remaining hydrogen sulfide from the solution.
2. Lead acetate is added to precipitate the complexes of lead 2,3-DMBDS which is separated from the solution.
3. 2,3-DMBDS is dissolved in concentrated sulfuric acid (20%) aqueous solution.
4. Vacuum evaporization obtains the sodium salt of 2,3-DMBDS, after the neutralization of the solution by $Na_2CO_3$ and
5. Extraction of 2,3-DMBDS with ethyl alcohol, and followed by recrystallization to obtain sodium salt of 2,3-DMBDS.

EXAMPLE 2

1,2-Dimercapto-3,4-butanedisulfonate(1,2-DMBDS).

The procedure to synthesize 1,2-DMBDS is similar to 2,3-DMBDS.

3,4-Dichloro-1-butene is added to an aqueous solution of sodium sulfite to produce 1-butene-3,4-disulfonate.

Bromine is added dropwise to an acetic acid solution of 1-butene-3,4-disulfonate at 10° to 15° C. to produce 1,2-dibromobutane-3,4-disulfonate.

Sodium hydrogen sulfide is reacted at ambient temperature with an aqueous solution of 1,2-dibromobutane-3,4-disulfonate to form 1,2-DMBDS.

The purification of 1,2-DMBDS is performed according to those described for 2,3-DMBDS above.

EXAMPLE 3

ABSORPTION OF NO - BUBBLING PROCESS (a) The removal of NO from a simulated flue gas by metal chelate solutions was performed with two different types of gas scrubbers: bubbling and spray tower absorbers. In a typical bubbling experiment (FIG. 1), a batch of scrubbing liquors was bubbled through by a continuous flow of a gas mixture.

A 100 ml aqueous solution containing 0.005 to 0.05M ferrous salts ($Fe(NH_4)_2(SO_4)_2.4H_2O$), 0.005 to 0.1M chelate DMC, and a buffer was placed in a PYREX® column (50 mm inner diameter ×210 mm long). Most of the experiments were performed with a molar ratio of DMC to ferrous ions of 2 unless specified otherwise. The pH of the solution was adjusted to the desired value (pH 3 to 10) by dropwise addition of either sodium hydroxide solution or concentrated sulfuric acid, and the reaction system was thermostated. Most of the experiments were performed at 55° C., while some of the experiments were done at 25°, 75°, and 95° C. The experiment was performed by bubbling a simulated flue gas stream through the ferrous chelate solutions. A simulated flue gas was composed of between 300 and 700 ppm NO, between 0% and 8% $O_2$, and the balance was nitrogen. The gas flow rate was about 1-L/min, corresponding to a contact time of flue gas with scrubbing liquors of approximately 6 sec. The NO concentration in the outlet gas was measured by a Thermoelectron Model 14A chemiluminescent $NO_x$ analyzer.

The absorption of NO was carried out until the NO concentration in the outlet gas became equal to that of the inlet gas, i.e., until saturation was reached.

(b) The process of subpart 3(a) is performed wherein the ligand DMC is independently selected from DMPS, DMBDS, DMBS, DEBS, DMBDO or DTO.

EXAMPLE 4

ABSORPTION OF NO - SPRAY TOWER PROCESS (a) A typical spray tower experiment (FIG. 2) was carried out in a 10 cm diameter by 120 cm long glass column installed with spray nozzles. Ten nozzles (0.2-L/min per nozzle) were divided into two parallel rows with each row containing 5 nozzles in series. A ferrous DMC chelate solution was sprayed in the absorber. A countercurrent flow of flue gas entered at the base of the absorber and passed upward through the falling spray of solution. The simulated flue gas mixture with about 5% oxygen contained 300–700 ppm NO. The gas stream flowed, at a rate of 140–280-L/min, through an electric air heater where it was heated to a temperature of 150°–175° C. The heated gas then entered the absorber. The contact time of flue gas with spraying solution was approximately 1 to 4 sec.

(b) The process of subpart 3(a) is performed wherein the ligand DMC is independently selected from DMPS, DMBDS, DMBS, DEBS, or DMBDO.

EXAMPLE 5

CHEMICAL REGENERATION

Ferrous chelates are oxidized by $O_2$ in flue gas to form ferric chelates, which are inactive in NO absorption. The ability of DMC to regenerate ferrous from ferric ions was demonstrated by two kind of experiments.

(a) The first experiment involved the measurement of NO absorption capacity as function of the molar ratio of DMC to ferrous ions in solutions. This ratio ranged from 1 to 8. A simulated flue gas containing about 500 to 650 ppm NO, 5% oxygen and the balance nitrogen was used. The NO absorption capacity increased with an increase in molar ratio of DMC to ferrous ions, indicating the ability of DMC to reduce ferric ions to ferrous ions.

(b) The second experiment involved the use of a solution containing a ferric salt and a DMC to absorb NO. Because ferric chelates do not coordinate NO, a positive NO absorption result indicates that DMC was capable of reducing ferric to ferrous ions.

EXAMPLE 6

REGENERATION OF $Fe^{2+}$(DMC)NO

The regeneration of $Fe^{2+}$(DMC) from the NO saturated scrubbing liquors, i.e. $Fe^{2+}$(DMC)NO, by chemical reagents was determined by two different types of experiments.

(a) The first type involves the addition of a chemical additive, such as cysteamine, to an $Fe^{2+}$(DMC) solution before an NO absorption experiment was performed. The increase of NO absorption capacity by the solution with an additive compared to without is indicative of the regenerative ability of the chemical additive.

(b) The second type of experiment involved the addition of a chemical additive into an NO saturated $Fe^{2+}$(DMC) solution and allowing several minutes of reaction before another NO absorption experiment was conducted. The revival of NO absorption by the solution indicates that the chemical additive employed is effective in the regeneration of $Fe^{2+}$(DMC) from $Fe^{2+}$(DMC)NO, by reacting with the bound NO.

EXAMPLE 7

ELECTROREGENERATION

An electrochemical cell consisting of two 250 ml round-bottom flasks connected by a "CELLGARD®" membrane was set up as shown in FIG. 3. In a typical experiment, the NO saturated and $O_2$ oxidized sorbent liquor (100 ml) was poured into the half-cell containing a graphite working electrode (area: about 4 $cm^2$) and the saturated calomel reference electrode (SCE). Nitrogen bubbling through the scrubber solution was then initiated. The electrolyte was $Na_2SO_4$ (0.1M), added to both half-cells. Since there is $OH^-$ generation at the working electrode and $H^+$ generation at the Pt counter electrode (area: about 2 $cm^2$), a buffer of sodium borate or citrate was also added. Electroreduction was initiated at an applied voltage of 10 V (0.1 to 0.5 amp) from the DC power supply. The potential across the working electrode, $E_{C-SCE}$, was monitored with the aid of a high-impedance voltmeter to ensure that it did not exceed −0.41 V, when reduction of $Fe^{2+}$ to $Fe^0$ was likely to occur.

Example 8

Toxic Metal Removal (a) A compound of the structure $HSCH_2-CH(NH_2)CH_2SH$ is covalently bonded through the —NH group to a solid surface of a water-insoluble a styrene-divinyl benzene copolymer having pendant —$CH_2Cl$ groups attached to the phenyl ring as described by H. W. Blanch, et al. in U.S. Pat. No. 5,073,575.

Multiple dimercapto groups are formed. The solid is contacted with an aqueous solution of cadmium or chromium ion for 1 hr.

(b) The solid ligand and metal ion reduced solution are separated;

(c) The solid-ligand is contacted with aqueous hydrochloric acid to remove metal ion and to regenerate active (DMC').

While only a few embodiments of the invention have been shown and described herein, it will become apparent to those skilled in the art that various modifications and changes can be made in the metal ion chelate process to remove pollutants from fluids or for the removal of hazardous metal ions from fluids without departing from the spirit and scope of the present invention. All such modifications and changes coming within the scope of the appended claims are intended to be carried out thereby.

I claim:

1. A process for the removal of $NO_x$ from a fluid containing $NO_x$ and optionally $SO_x$, which comprises:
   (a) contacting the fluid as a gas containing $NO_x$ and optionally $SO_x$ at autogenic pressure at a pH of between about 3 and 10 and at temperature of between about 10° and 99° C. with an aqueous solution comprising:
      (i) a water-soluble ferrous salt,
      (ii) an inorganic acid or inorganic base added as needed to maintain the pH of the reaction at between about 3 and 10,
      (iii) and a ligand able to form a ferrous ion-chelate or a ferric ion chelate; wherein said ligand is DMC, a dimercapto-containing compound or a salt of the structure:

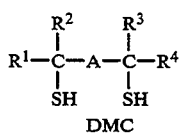

(I)

DMC wherein A is independently selected from a direct bond or

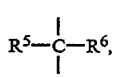

$R^1$, $R^2$, $R^3$, $R^4$, $R^5$, and $R^6$ are each independently selected from hydrogen, sulfonate, sulfoxide, amine, hydroxyl, ether, aldehyde ketone, alkyl sulfonate, aryl sulfonate, hydroxyl, amine, alkyl having 1 to 10 carbon atoms, substituted alkyl, aryl, substituted aryl, alkylenearyl, or alkylene substituted aryl, wherein the substitutions of the alkyl or aryl are each independently selected from one or more of the functional groups of mercapto, sulfonate, sulfoxide, amine, ether, aldehyde, ketone, alkyl sulfonate, aryl sulfonate, carboxylic acid, and hydroxyl alkyl with the provision that said ligand is not dimercaptosuccinic acid;

$R^1$ and $R^2$ together contain at least one carbon atom, and $R^3$ and $R^4$ together contain at least one carbon atom, with the provision that at least one of $R^1$, $R^2$, $R^3$, $R^4$, $R^5$, or $R^6$ contains a polar functional group so that the ligand, the ferrous ion chelate or ferric ion chelate present is water soluble;

(b) reducing by use of a reducing agent or by electroreduction the aqueous solution of step (a) containing $Fe^{2+}$DMC.NO in the presence of acid or base to maintain the pH between about 3 and 10 at between about 0.2 to 20 volts at between about 0.1 and 20 amps to produce $Fe^{2+}$DMC, and (c) optionally isolating and recycling the regenerated $Fe^{2+}$DMC to step (a).

2. The process of claim 1 wherein $NO_x$ is in the gas of step (a) present in the substantial absence of $SO_x$.

3. The process of claim 1 wherein $NO_x$ and $SO_x$ are both present in the gas in step (a) and the dimercapto compound also comprises an amino moiety.

4. The process of claim 1 wherein in step (a) the temperature is between about 30° and 80° C.

5. The process of claim 4 wherein $NO_x$ and $SO_x$ are both present in the gas phase in step (a), and the dimercapto compound of step (a) iii further includes an amino moiety.

6. The process of claim 4 wherein $R^1$ and $R^2$ together contain at least 1 carbon atom and $R^3$ and $R^4$ together contain at least 1 carbon atom.

7. (Amended) A process for the removal of NO from a fluid containing NO, which process comprises:
   (a) contacting the fluid as a gas comprising NO at autogenic pressure at a pH of between about 3 to 10 at a temperature between about 10° and 99° C. with an aqueous solution, itself comprising:
      (i) a water-soluble ferrous salt,
      (ii) an inorganic acid or inorganic base to maintain the pH of the reaction at between about 3 and 10, and
      (iii) a ligand able to form a ferrous ion-chelate wherein said ligand is DMC', a dimercapto-containing compound of the structure:

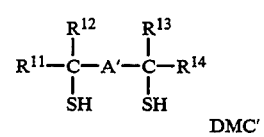

DMC'

A' is independently selected from a direct bond or

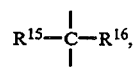

wherein $R^{11}$, $R^{12}$, $R^{13}$, $R^{14}$, $R^{15}$ and $R^{16}$ are each independently selected from hydrogen, alkyl having 1 to 10 carbon atoms, substituted alkyl, aryl, substituted aryl, alkylenearyl, or alkylene substituted aryl, wherein the substitutions of the alkyl or aryl are each independently optionally selected from one or more of the functional groups of mercapto, sulfonate, sulfoxide, amine, ether, hydroxyl, aldehyde, ketone, alkyl sulfonate, aryl sulfonate, amine, carboxylic acid, or hydroxylalkyl;

$R^{11}$ and $R^{12}$ together contain at least 1 carbon atom, and $R^{13}$ and $R^{14}$ together contain at least 1 carbon atom, with the provision that at least one of $R^{11}$, $R^{12}$, $R^{13}$, $R^{14}$, $R^{15}$, or $R^{16}$ contains a functional group so that the ligand can be covalently bonded to a solid water insoluble substrate, (b) reducing, by use of a reducing agent or by electroreduction, the aqueous solution of step (a) containing $Fe^{2+}DMC'.NO$ in the presence of acid or base to maintain the pH between about 3 and 10, wherein the electroreduction occurs at between about 0.2 to 20 volts at between about 0.1 and 20 amps to produce $Fe^{2+}DMC'$, and (c) optionally isolating and recycling the regenerated $Fe^{2+}DMC'$ to step (a).

8. The process of claim 7 wherein the solid substrate is a particle or a solid article and is independently selected from a synthetic organic polymer, a resin, glass, silica, alumina, metal, or alloy.

9. The process of claim 7 wherein the solid substrate is a synthetic organic polymer or resin selected from a polystyrene, polystyrenedivinylbenzene, a polyester, a polyethylene, a polypropylene, a polyamide, a polyacrylamide, polyacrylonitrile, a polyepoxide, a polycarbonate, or combinations thereof.

10. The process of claim 8 wherein the polymer is a polystyrene or a polystyrene-divinylbenzene.

11. The process of claim 1 wherein in step (b) a chemical reducing agent is used.

12. The process of claim 1 wherein in step (b) an electroreduction process is used.

13. The process of claim 7 wherein in step (b) a chemical reducing agent is used.

14. The process of claim 7 wherein the step (b) an electroreduction process is used.

15. A process for the removal of $NO_x$ from a fluid containing $NO_x$ and optionally $SO_x$, which comprises:

(a) contacting the fluid as a gas containing $NO_x$ and optionally $SO_x$ at autogenic pressure at a pH of between about 3 and 10 and at a temperature of between about 10 and 99° C. with an aqueous solution, comprising:

(i) a water-soluble ferrous salt, (ii) an inorganic acid or inorganic base used as needed to maintain the pH of the reaction at between about 3 and 10, (iii) and a ligand able to form a ferrous ion-chelate, wherein said ligand is DMC, a dimercapto-containing compound thereof or a salt selected from the group consisting of:

2,3-dimercapto-1-propanesulfonate;
2,3-dimercapto-1,4-butanesulfonate;
1,2-dimercapto-3,4-butanedisulfonate;
p-1,2-dimercaptoethylbenzenesulfonate;
p-1,2(dimercaptopropoxy)benzenesulfonate; dithiooxalate;
2,3-dimercapto-1,4-butanediol; cysteamine.HCl; and
2,3-dimercapto-2-propanesulfonate.

(b) reducing, by use of a reducing agent or by electroreduction the aqueous solution of step (a) containing $Fe^{2+}DMC.NO$ in the presence of an acid or a base to maintain the pH between about 3 and 10, wherein the electroreduction occurs at between about 0.2 to 20 volts at between about 0.1 and 20 amps to produce $Fe^{2+}DMC$, and (c) optionally isolating and recycling the regenerated $Fe^{2+}DMC$ to step (a).

16. The process of claim 1 wherein in step (b) the $Fe^{2+}DMC.NO$ is heated to between about 75° and 100° C. to desorb NO producing $Fe^{2+}DMC$, followed by electroreduction to produce DMC in a scrubbing liquor at between about 0.2 and 20 volts at between about 0.1 and 20 amps at a pH of between about 3 and 10 to produce DMC essentially free of S—S— bonds.

* * * * *